(12) United States Patent
Lee et al.

(10) Patent No.: US 8,077,671 B2
(45) Date of Patent: Dec. 13, 2011

(54) METHOD AND SYSTEM FOR TRANSMITTING DATA IN MOBILE COMMUNICATIONS SYSTEM

(75) Inventors: Jinsock Lee, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 437 days.

(21) Appl. No.: 11/691,205

(22) Filed: Mar. 26, 2007

(65) Prior Publication Data

US 2007/0286125 A1      Dec. 13, 2007

(30) Foreign Application Priority Data

Mar. 27, 2006 (JP) ................. 2006-086724

(51) Int. Cl.
*H04W 4/00* (2009.01)
(52) U.S. Cl. ........ 370/331; 370/328; 370/338; 455/436; 455/443
(58) Field of Classification Search .......... 455/436–453, 455/432.1; 370/331–334, 328, 338
See application file for complete search history.

(56) References Cited

U.S. PATENT DOCUMENTS

| | | | | |
|---|---|---|---|---|
| 5,896,373 A * | 4/1999 | Mitts et al. | ...................... | 370/331 |
| 5,940,371 A * | 8/1999 | Mitts et al. | ...................... | 370/236 |
| 5,966,374 A * | 10/1999 | Rasanen | ...................... | 370/337 |
| 6,553,015 B1 * | 4/2003 | Sato | ...................... | 370/331 |
| 6,611,547 B1 * | 8/2003 | Rauhala | ...................... | 370/331 |
| 6,717,927 B2 * | 4/2004 | Chao et al. | ...................... | 370/331 |
| 6,775,533 B2 * | 8/2004 | Kakani et al. | ...................... | 455/403 |
| 7,065,362 B2 * | 6/2006 | Lee et al. | ...................... | 455/442 |
| 7,333,793 B2 * | 2/2008 | Niemela et al. | ...................... | 455/336 |
| 7,395,066 B2 * | 7/2008 | Pedersen | ...................... | 455/436 |
| 7,414,983 B2 * | 8/2008 | Vasudevan et al. | ...................... | 370/252 |
| 7,433,337 B2 * | 10/2008 | Chao et al. | ...................... | 370/331 |
| 2004/0005893 A1 * | 1/2004 | Isobe et al. | ...................... | 455/436 |
| 2006/0209686 A1 * | 9/2006 | Wigard et al. | ...................... | 370/229 |
| 2007/0165574 A1 * | 7/2007 | Srey et al. | ...................... | 370/331 |
| 2008/0095112 A1 * | 4/2008 | Wiemann et al. | ...................... | 370/331 |

FOREIGN PATENT DOCUMENTS

| | | |
|---|---|---|
| EP | 1 383 292 A1 | 1/2004 |
| EP | 1 603 359 A1 | 12/2005 |
| JP | 2003-111134 A | 4/2003 |
| JP | 2004-282652 | 10/2004 |
| KP | 2005-0023194 | 3/2005 |
| WO | WO-00/05909 A1 | 2/2000 |

OTHER PUBLICATIONS

3rd Generation Partnership Project: Technical Specification Group Services and System Aspects; 3GPP System Architecture Evolution: Report on Technical Options and Conclusions (Release 7), 3GPP TR 23.882 vo 0.10.0 (Jan. 2006).

* cited by examiner

*Primary Examiner* — Kent Chang
*Assistant Examiner* — Magdi Elhag
(74) *Attorney, Agent, or Firm* — Dickstein Shapiro LLP

(57) ABSTRACT

A new data transmission method and system that can enhance the speed of data transfer between base stations are provided. Unsent data stored at a base station is transmitted through a plurality of routes. The base station stores unsent packets destined for a mobile station or a gateway. The base station transmits some of the unsent packets to the mobile station or the gateway and transfers the other remaining packets to a handover-target base station. The handover-target base station transmits the received other packets to the mobile station or the gateway.

16 Claims, 18 Drawing Sheets

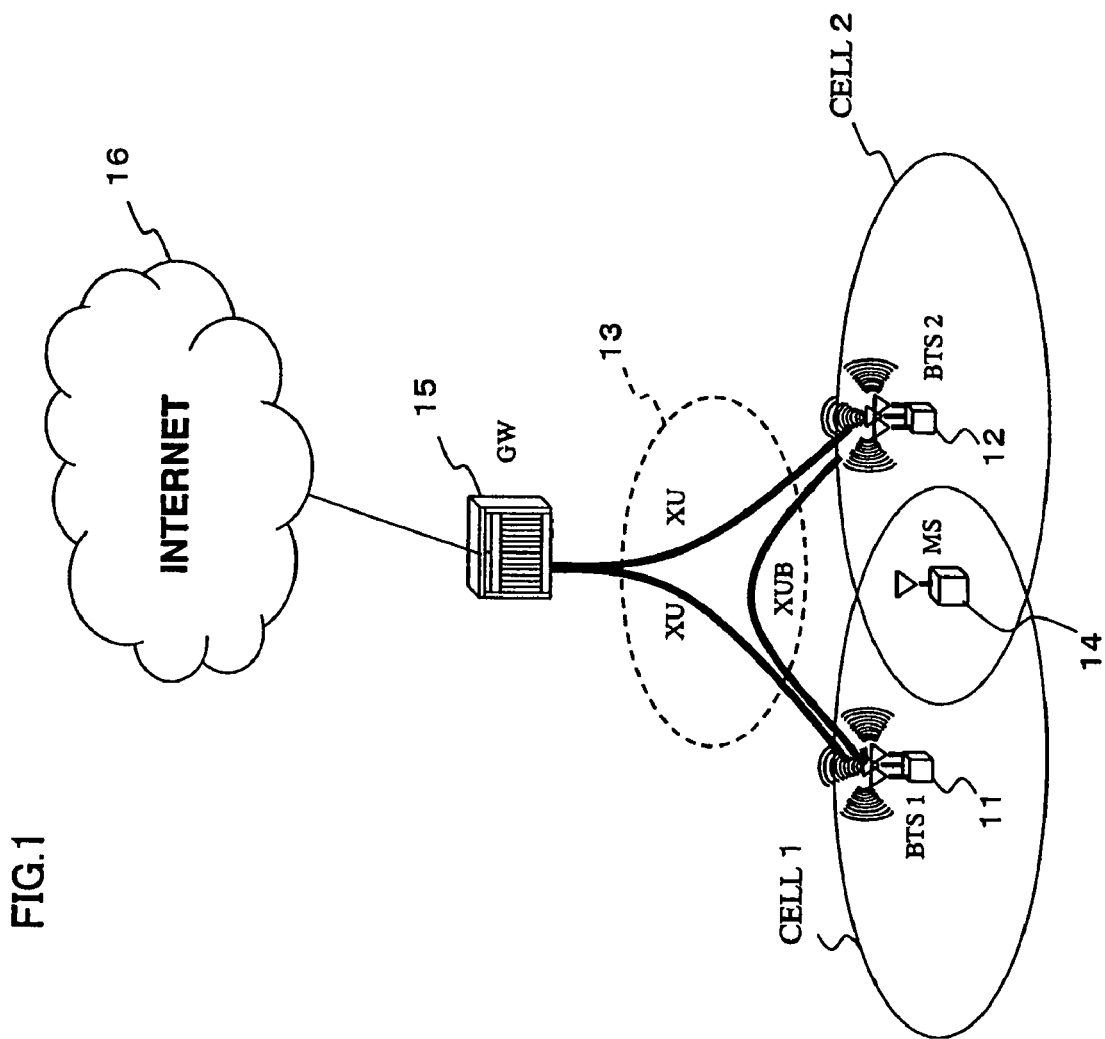

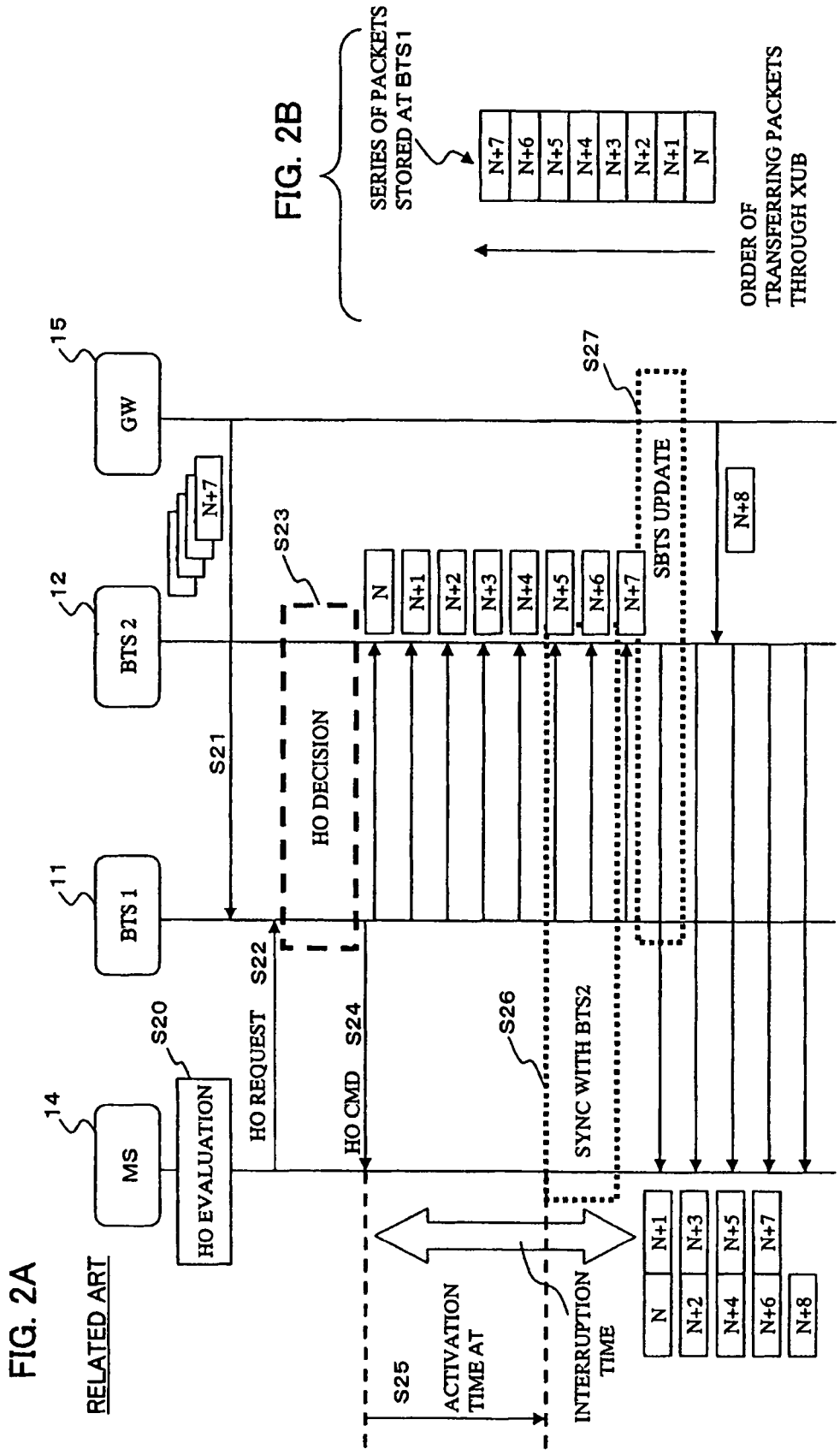

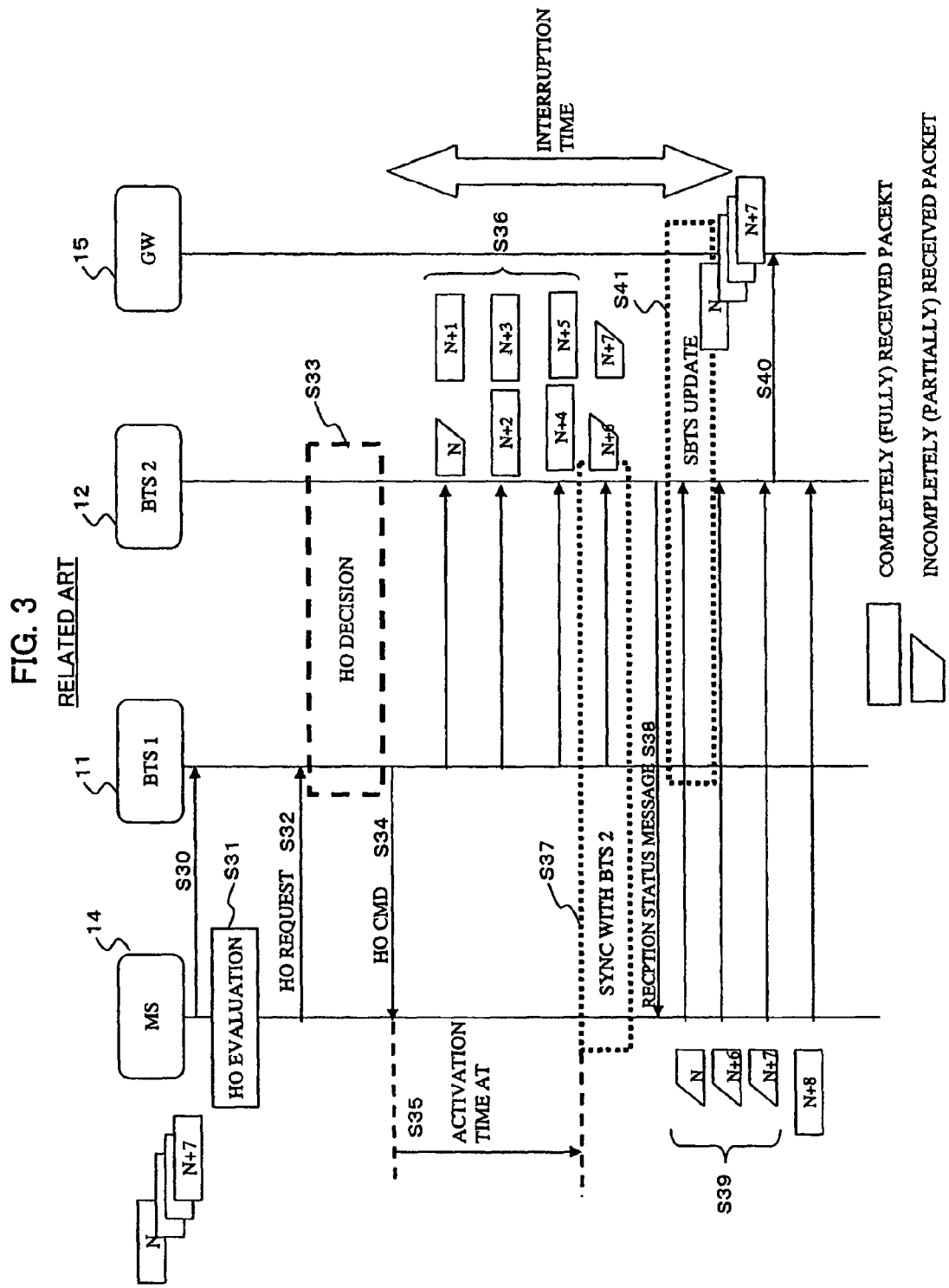

SECOND MODE

FIRST MODE

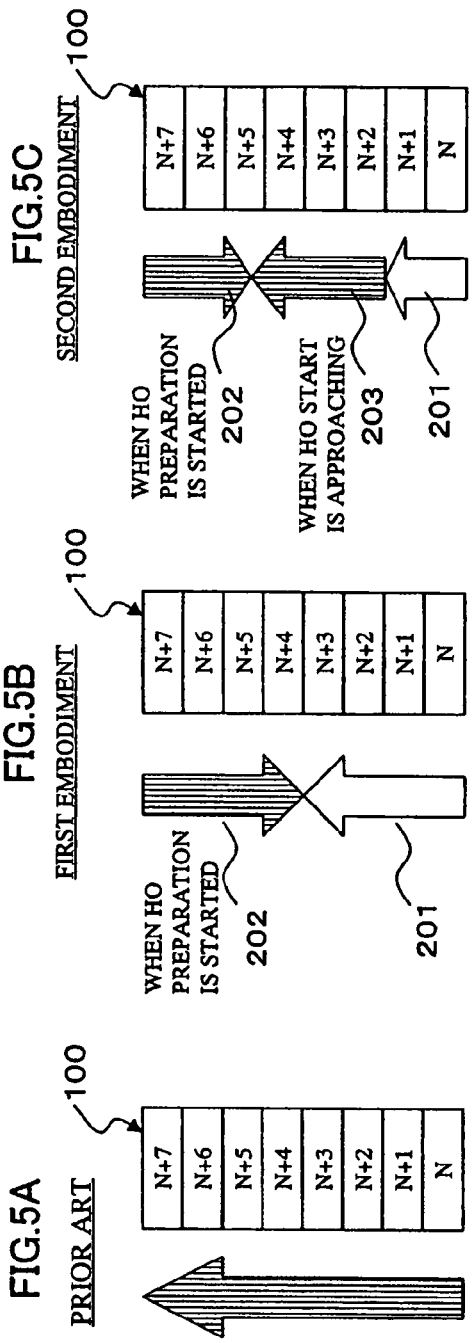
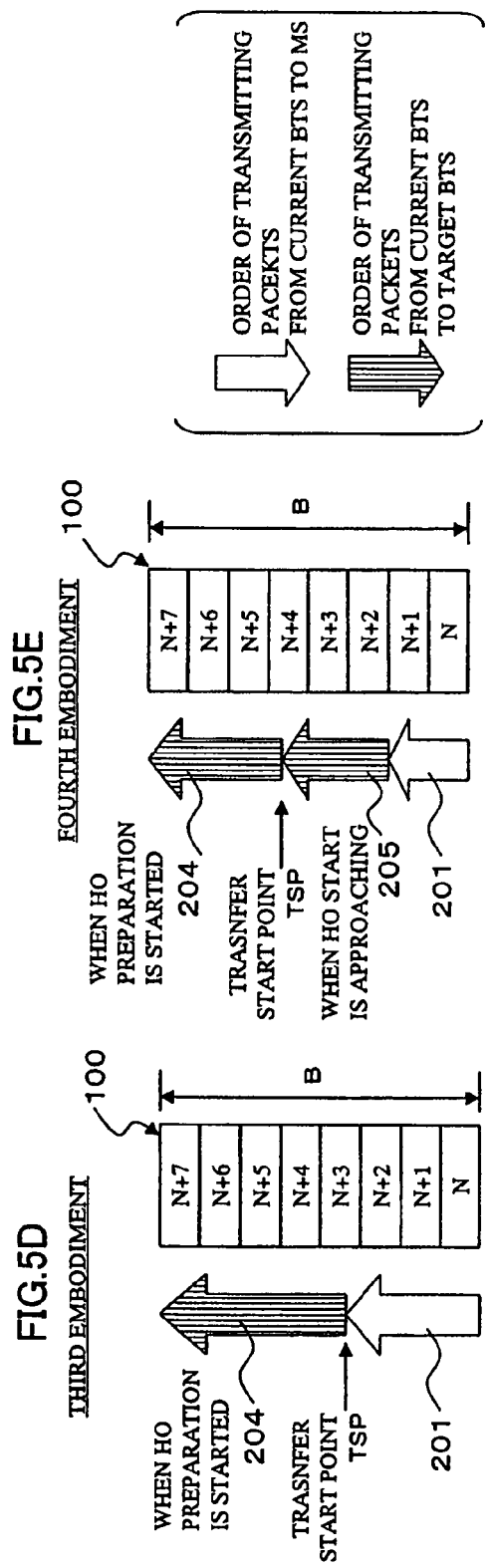

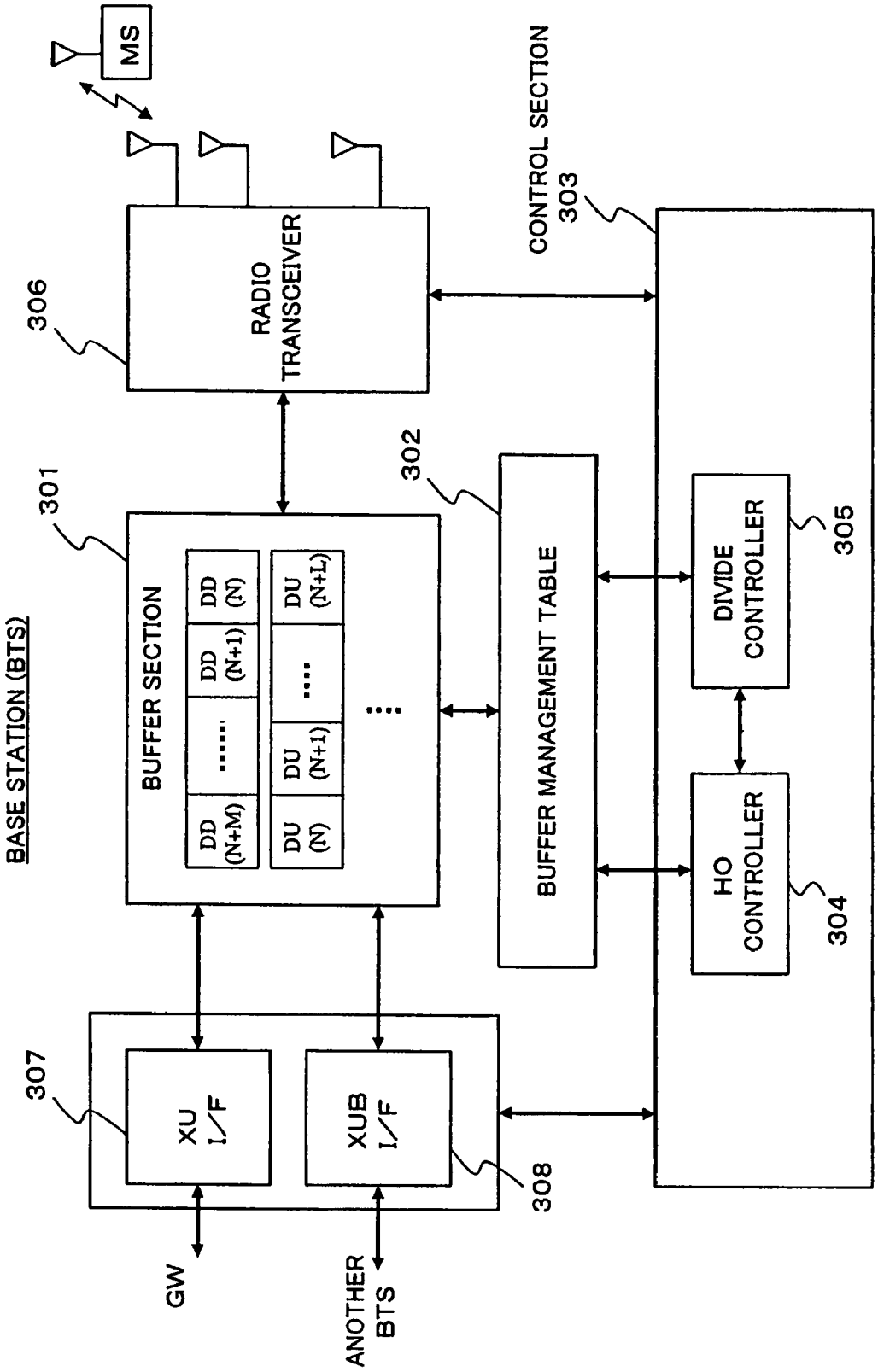

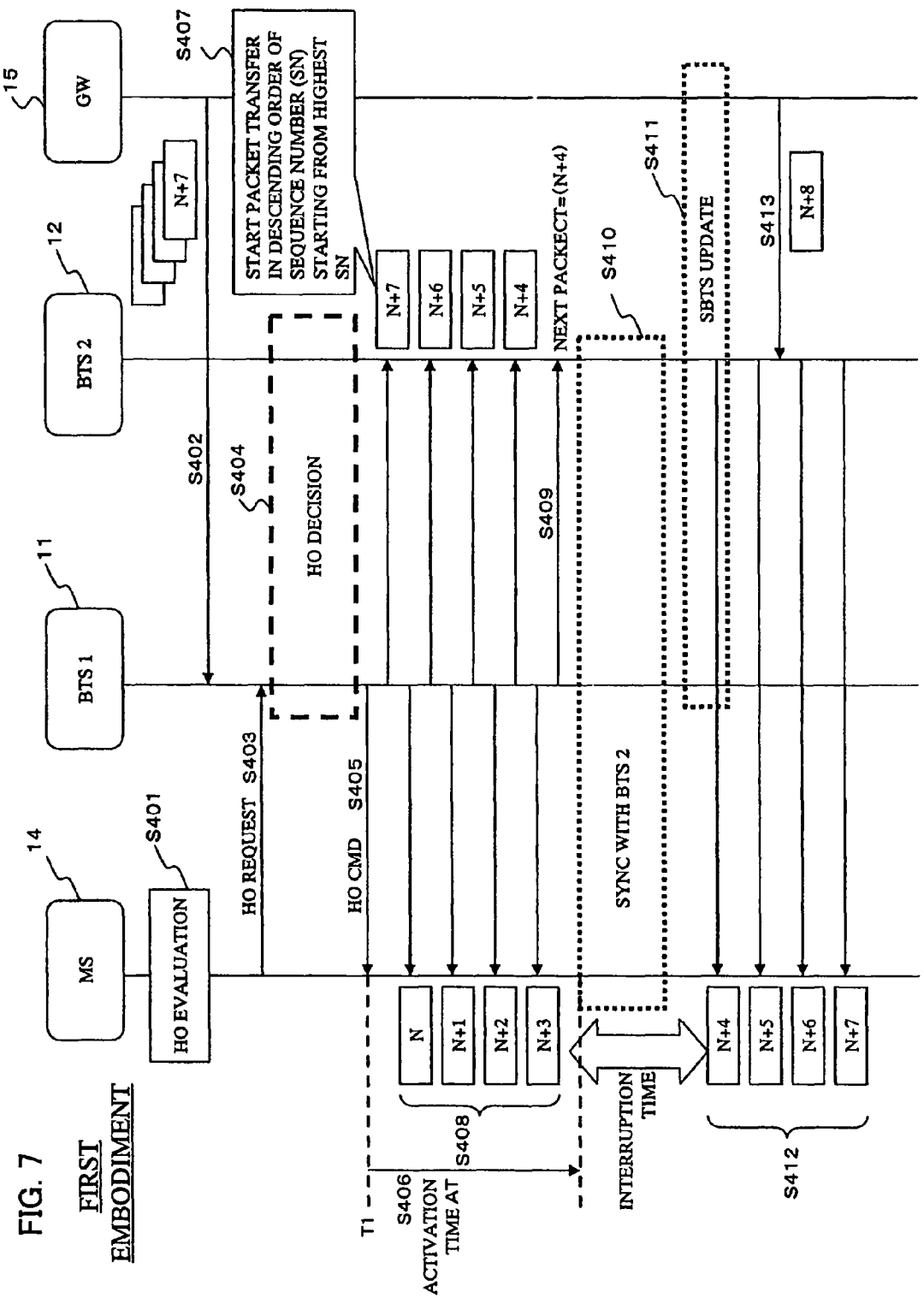

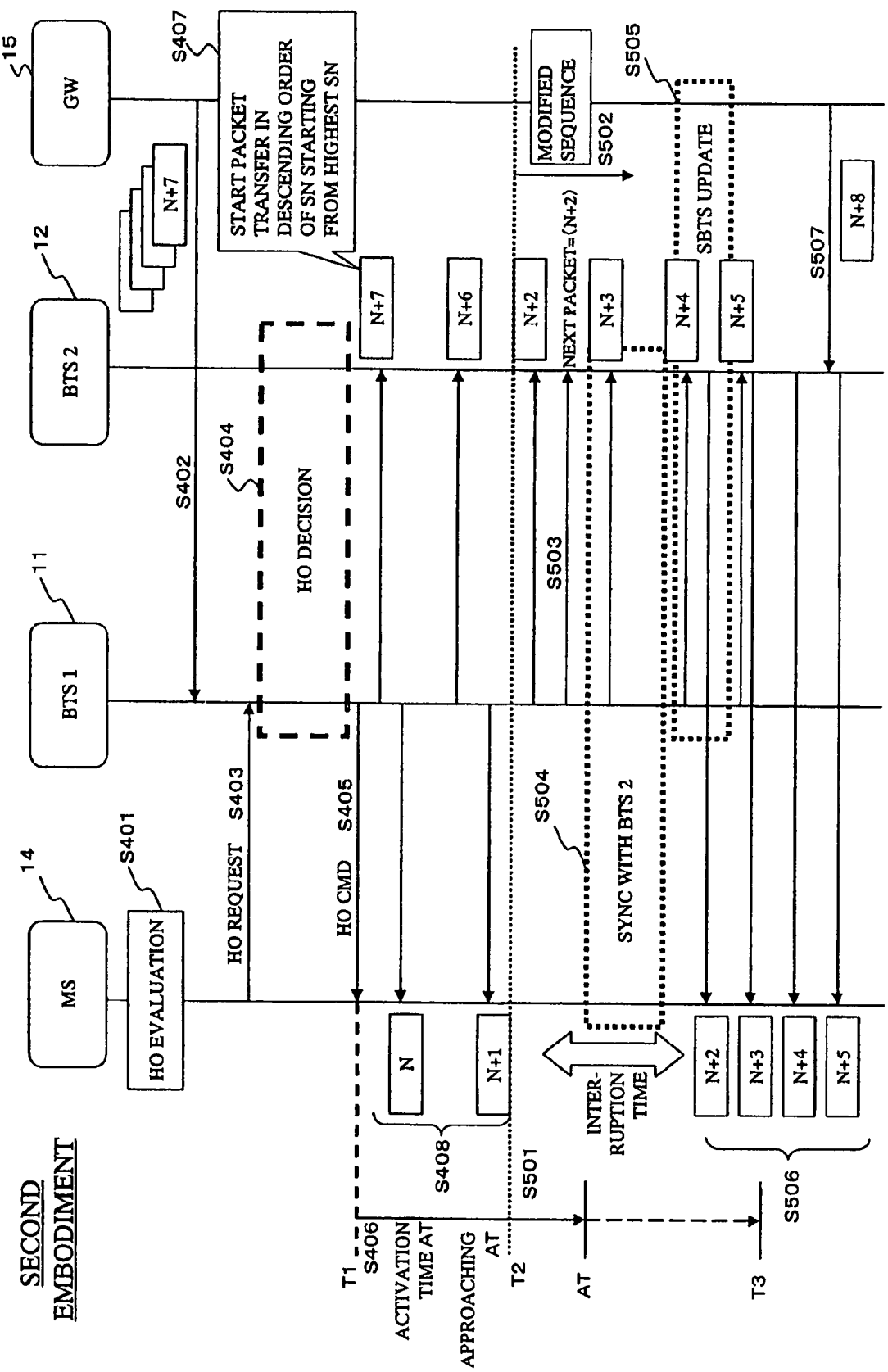

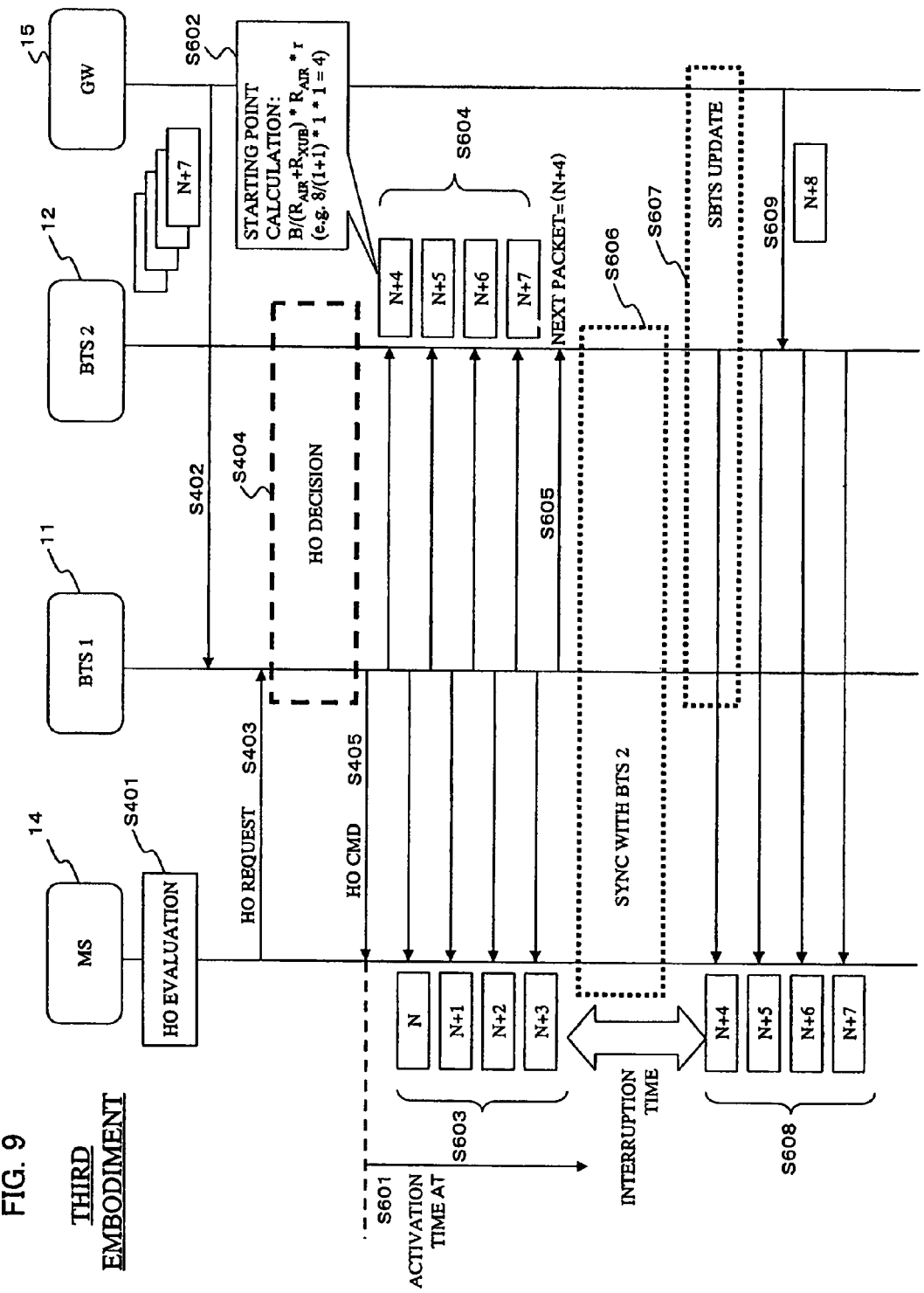

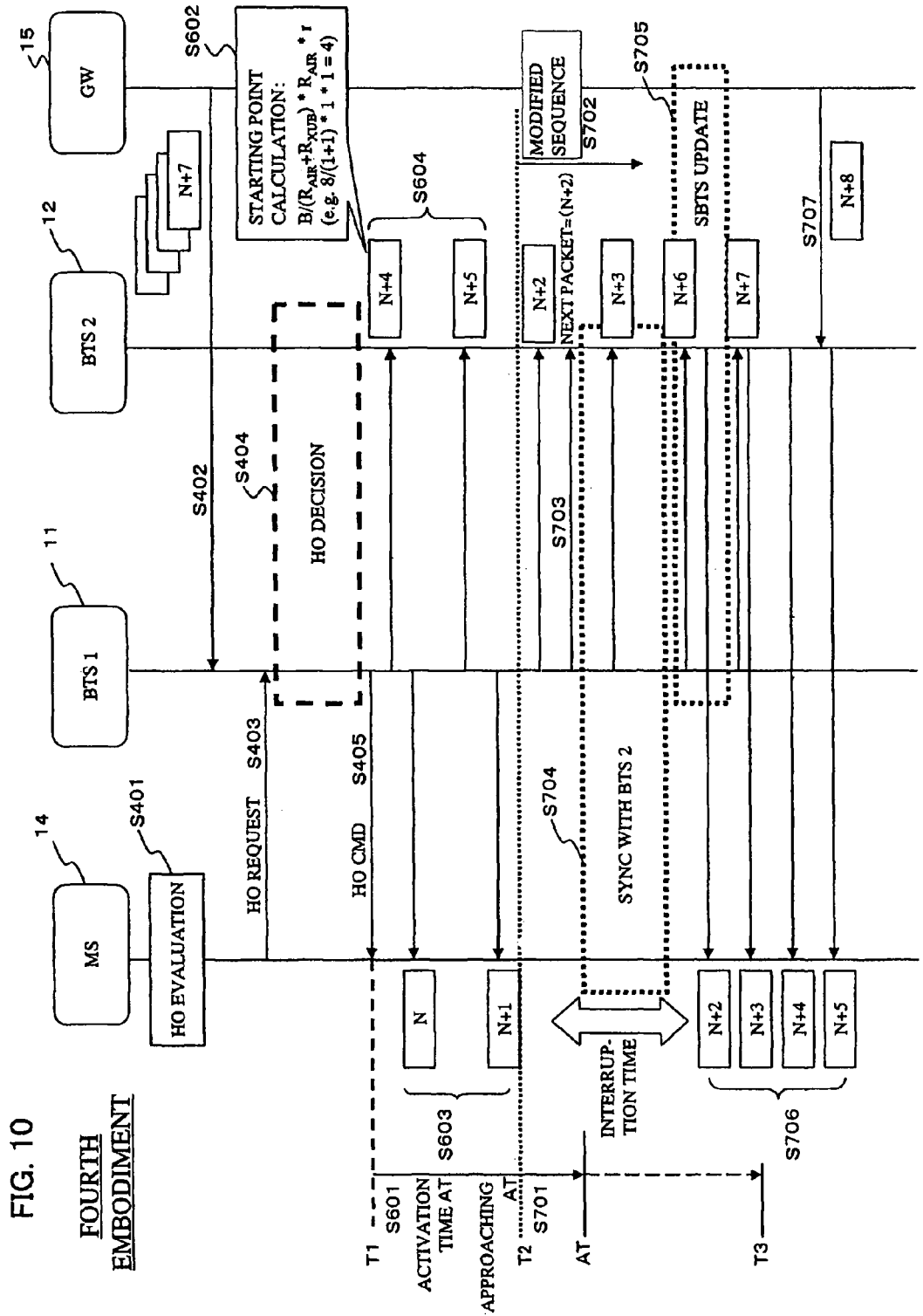

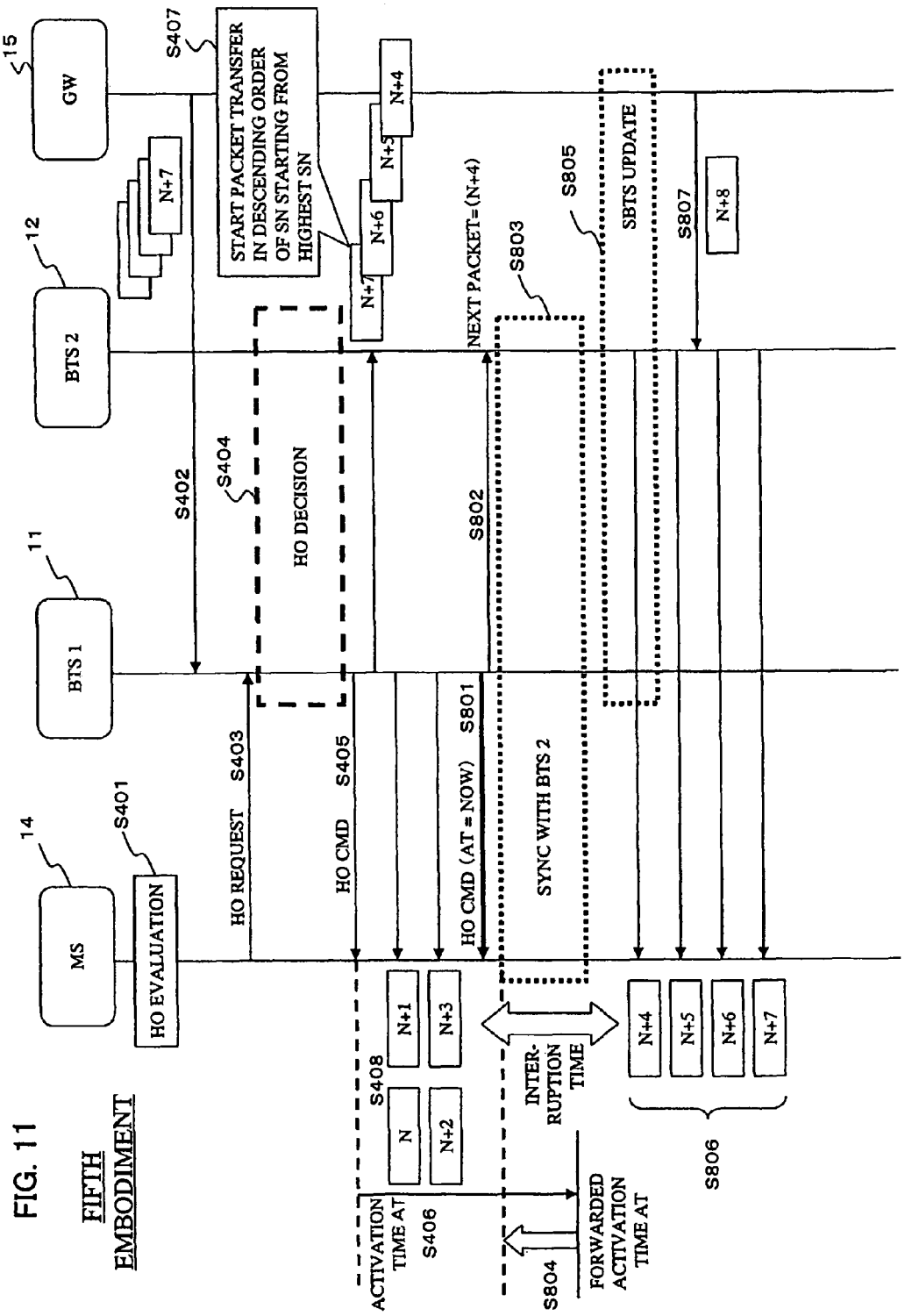

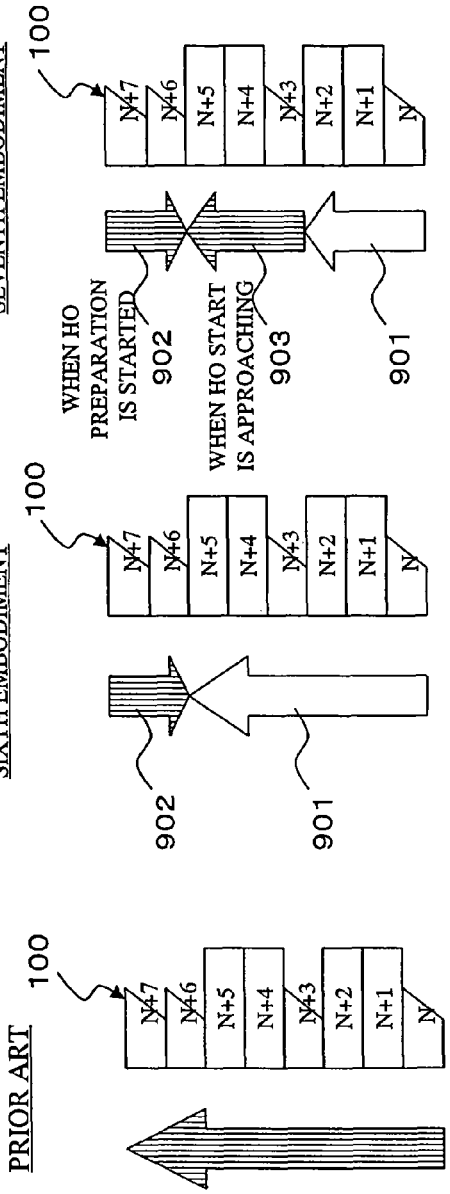
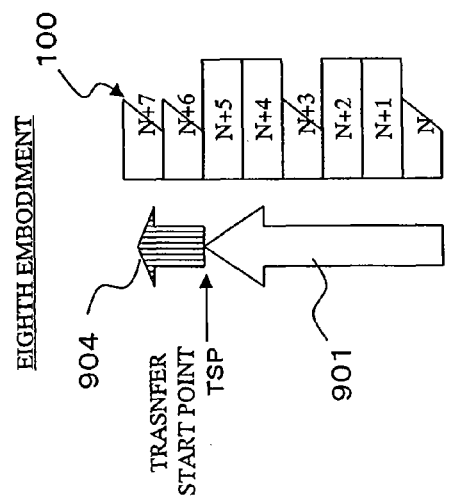

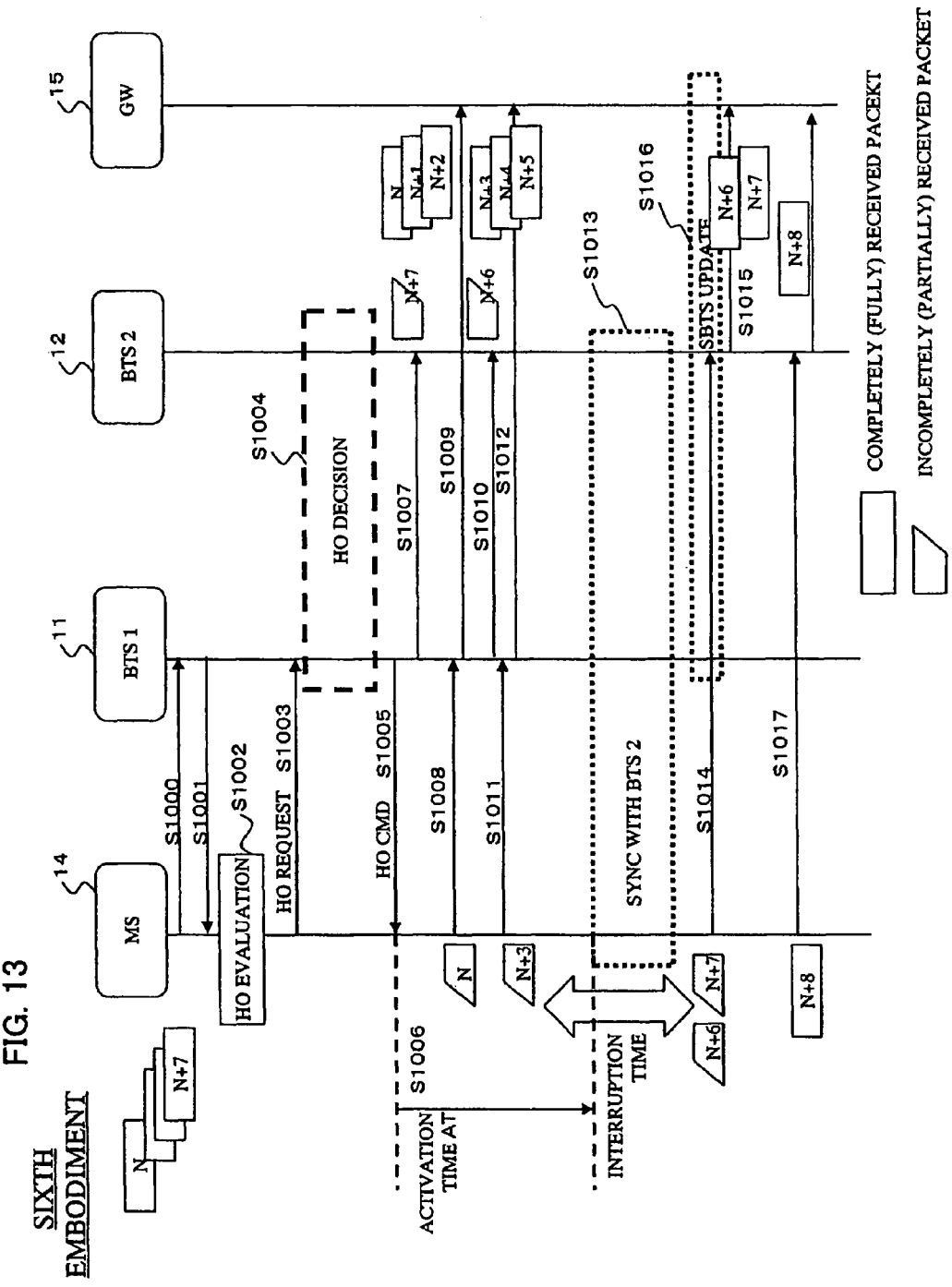

SEVENTH EMBODIMENT

METHOD AND SYSTEM FOR TRANSMITTING DATA IN MOBILE COMMUNICATIONS SYSTEM

BACKGROUND OF THE INVENTION

1. Field of the Invention

The present invention relates to a mobile communications system and, more particularly, to a method and system for transmitting data when a handover occurs between base stations for a mobile station that is performing data communication.

2. Description of the Related Art

In a mobile communications system or the like employing a packet transmission technique, for example, high-speed packet transmission technique such as HSDPA (High Speed Downlink Packet Access) and EUDCH (Enhanced Uplink Dedicated Channel), significant technical challenges are to prevent loss of data, minimize the duration of a communication interruption and the like at the time of handover (hereinafter, abbreviated as "HO" where appropriate). For example, Japanese Patent Application Unexamined Publication No. 2004-282652 discloses a mobile communications system having a base station controller, in which when a handover occurs between base stations while high-speed packet communication is taking place, the base station controller transfers packet data from the current base station to the handover-target base station, thereby avoiding data loss during handover.

Moreover, at present, the 3GPP LTE (Third Generation Partnership Project, Long Term Evolution) is proposing a handover technique based on data transfer between base stations (see 3GPP TR 23.882 V0.10.0 (2006-01), 3rd Generation Partnership Project; Technical Specification Group Services and System Aspects; 3GPP System Architecture Evolution: Report on Technical Options and Conclusions (Release 7)). Hereinafter, brief description will be given of the handover technique using data transfer between base stations, with reference to the accompanying drawings.

FIG. 1 is a network structure diagram schematically showing a general mobile communications system. Here, to simplify the description, it is assumed that two base stations (BTS) 11 and 12 can connect to each other through a network 13, that the base station 11 is the serving base station of a mobile station (MS) 14, and that the mobile station 14 is moving from a cell 1 of the base station 11 into a cell 2 of the target base station 12.

Each of the base stations 11 and 12 can communicate with a gateway (GW) 15 through the network 13. The mobile station 14 transmits and receives data packets to/from the Internet 16 through its serving base station and the gateway 15. Hereinafter, it is assumed that communications between the base stations are performed through an interface XUB and that communications between each base station and the gateway 15 are performed through an interface XU.

1) Downlink Packet Transmission

FIG. 2A is a sequence diagram showing conventional procedures for handover and downlink data transmission using data transfer between base stations. FIG. 2B is a schematic diagram showing an order of transferring unsent packets stored at a serving base station. First, the mobile station 14 evaluates determines the necessity of a handover from the base station 11 to the base station 12 (S20). At this point in time, it is assumed that the base station 11 has received from the gateway 15 packets D(N) to D(N+7) destined for the mobile station 14 (S21), where N is an integer not smaller than zero, and x of a data packet D(x) is a sequence number assigned on the sending side, where the larger x is, the later (the newer, in general) the packet is (the same applies hereinafter).

Here, the serving base station 11 is in a state where packet transmission to the mobile station 14 has been done with up to a packet D(N−1) and where transmission of the packets D(N) to D(N+7) to the mobile station 14 has not started yet, or none of the packets D(N) to D(N+7) has been fully transmitted.

When the mobile station 14 sends a HO request to the serving base station 11 (S22), a handover between the base station 11 and the target base station 12 is decided (S23). When the handover is decided and a HO command, in which a HO activation time AT is set, is sent from the base station 11 to the mobile station 14 (S24), a timer for the HO activation time AT is started (S25). The base station 11 sequentially transfers the stored data packets D(N) to D(N+7) in this order to the base station 12 through the interface XUB.

When the HO activation time AT has expired, the mobile station 14 establishes physical-layer synchronization with the new serving base station 12 (S26). When the synchronization is established, the base station 12 starts sequentially transmitting the transferred packets D(N) to D(N+7) to the mobile station 14. Meanwhile, the gateway 15 updates the serving base station of the mobile station 14 from the base station 11 to the base station 12, based on notifications from the base stations 11 and 12 (S27).

As described above, when a handover occurs, unsent downlink data packets, stored at the base station 11, are transferred to the handover-target base station 12, from which the data packets are transmitted to the mobile station 14. Therefore, loss of data can be suppressed at the time of handover.

2) Uplink Packet Transmission

As to uplink packets to be transmitted from the mobile station 14 to the gateway 15 as well, when a handover occurs, unsent packets are stored at a serving base station and transferred from the serving base station to a target base station. Hereinafter, an uplink-packet case will be described briefly.

FIG. 3 is a sequence diagram showing conventional procedures for handover and uplink data transmission using data transfer between base stations. First, the mobile station 14 transmits uplink packets D(N) to D(N+7) to the current serving base station 11 (S30). It is assumed that these packets are not completely received by the base station 11. For example, when the mobile station 14 transmits one uplink packet D(N) to the base station 11, the mobile station 14 disassembles the packet into a plurality of parts and transmits each part to the base station 11. However, all the parts are not always completely received by the base station 11. If the parts are not completely (or partially) received, the packet D(N) cannot be assembled, which will be referred to as an incompletely (or partially) received packet. Therefore, to transmit packets in order of sequence number, the base station 11 keeps also the fully received packet D(N+1) and subsequent packets without transmitting them. The base station 11 sends a report on the states of these received packets to the mobile station 14, thereby receiving again the packet that has not been completely received.

However, if the mobile station 14, immediately after the incomplete transmission to the serving base station 11, evaluates the necessity of a handover from the base station 11 to the base station 12 (S31) and sends a HO request to the serving base station 11 (S32), the base station 11 stores the received packets and starts HO control. First, when a handover between the base station 11 and the target base station 12 is decided (S33) and a HO command, in which a HO activation time AT is set, is sent from the base station 11 to the mobile station 14 (S34), then a timer for the HO activation time AT is started (S35). The base station 11 sequentially transfers a series of the received packets stored and information about the states of the received packets to the base station 12 through the interface XUB (S36).

Referring to FIG. 3, it is assumed that a fully received packet is represented by a rectangle, and an incompletely (partially) received packet is represented by a trapezoid. Here, the packets D(N), D(N+6) and D(N+7) are assumed to have been incompletely or partially received and are represented by trapezoids. Since the packet D(N) is incomplete, the subsequent packets are also stored at the base station 11 without being transmitted to the gateway 15.

When the HO activation time AT has expired, the mobile station 14 establishes physical-layer synchronization with the new serving base station 12 (S37). When the synchronization with the mobile station 14 is established, the base station 12 sends a report on the states of the received packets to the mobile station 14 (S38). In response to this, the mobile station 14 transmits the packets D(N), D(N+6) and D(N+7) to the base station 12 (S39). When all the packets become complete, the base station 12 transmits the uplink packets D(N) to D(N+7) to the gateway 15 (S40). Meanwhile, the gateway 15 updates the serving base station of the mobile station 14 from the base station 11 to the base station 12, based on notifications from the base stations 11 and 12 (S41).

As described above, when a handover occurs, unsent uplink data packets, stored at the base station 11, are transferred to the handover-target base station 12, from which the packets are then transmitted to the gateway 15 after those corresponding to incomplete packets have been completely received from the mobile station 14. Therefore, loss of data can be suppressed at the time of handover.

However, according to the conventional data transmission procedure shown in FIG. 2A, when a handover is decided, the current serving base station 11 does not transmit the downlink packets D(N) to D(N+7) to the mobile station 14 but transfers them to the base station 12 through the interface XUB. Therefore, even after synchronization has been established between the mobile station 14 and the new serving base station 12, the mobile station 14 cannot receive data at all until all the downlink packets are transferred to the base station 12 and start to be transmitted from the base station 12. During this period, the communication falls in an interruption state. The narrower the bandwidth of the interface XUB between the base stations, the longer time it takes to transfer the packets, and hence the longer the duration of a communication interruption. The duration of a communication interruption is a factor directly related to the quality of radio service, particularly greatly affecting the user's feeling about usability.

Moreover, according to the conventional data transmission procedure shown in FIG. 3, at the time of handover, the unsent uplink data packets stored at the base station 11 are transferred to the handover-target base station 12 and, after the incomplete packets are made complete, transmitted from the base station 12 to the gateway 15. Therefore, even after synchronization has been established between the mobile station 14 and the new serving base station 12, the mobile station 14 practically falls in a state of transmitting no data until all the uplink packets are transferred to the new serving base station 12, which then finishes receiving the packets corresponding to the incomplete packets again and starts transmitting the uplink packets (S40). During this period, the communication falls in an interruption state. The narrower the bandwidth of the interface XUB between the base stations, the longer time it takes to transfer the packets, and hence the longer the duration of a communication interruption. The duration of a communication interruption is a factor directly related to the quality of wireless service, particularly greatly affecting the user's feeling about usability.

To reduce the above-described duration of a communication interruption, the data transfer between the base stations needs to be carried out at as high speed as possible. However, it is undesirable to increase the transfer rate by widening the bandwidth of the interface XUB between the base stations only for this purpose, from the viewpoint of the effective use of network resources. Wireless carriers may also be burdened with higher costs.

SUMMARY OF THE INVENTION

Accordingly, an object of the present invention is to provide a new data transmission method and system that can reduce the quantity of data to be transferred between base stations.

Another object of the present invention is to provide a mobile communications system that can reduce the duration of a communication interruption at the time of handover, as well as a data transmission method to accomplish this system.

Still another object of the present invention is to provide a mobile communications system that can enhance the quality of communication at the time of handover, as well as a data transmission method to accomplish this system.

According to the present invention, the unsent data stored in a base station is transmitted to a destination station through a plurality of routes, achieving high-speed data transmission between base stations. Transmission of data between a first station and a second station via base stations in a mobile communications system, is performed by a first base station and a second base station such that the first base station stores unsent data destined for a destination station which is either of the first station and the second station and transmits one part of the unsent data to the destination station and the other part to a second base station, and the second base station transmits the other part of the unsent data to the destination station.

The first base station can divide the unsent data into the one part and the other part by sequentially transmitting the unsent data starting from two different positions in a sequence of the unsent data. According to an embodiment of the present invention, the first base station sequentially transmits the unsent data to the destination station starting from a front-side position in the sequence of the unsent data and/or starting from a backend-side position in the sequence of the unsent data. The backend-side position can be determined based on a first transmission rate between the first base station and the destination station and a second transmission rate between the first base station and the second base station.

The first base station may control timing of switching a connection for data transmission of the first station from the first base station to the second base station. If there is a remaining part of the unsent data when approaching the timing, the first base station may sequentially transmit the remaining part to the second base station. The timing may be determined based on a first transmission rate between the first base station and the first station and a second transmission rate between the first base station and the second base station.

As described above, according to the present invention, the unsent data stored in the first base station is transmitted to the destination station such that one part of the unsent data is transmitted to the destination station and the other part to the second base station, resulting in the reduced amount of data transferred between the first and second base stations. Accordingly, even if a plurality of handovers are concurrently processed, the duration of data transfer between base stations can be prevented from becoming longer, achieving shortened communication interruption duration on handover and improved quality of communication.

For example, one part of the unsent data is transmitted from the current serving base station to the mobile station and the other part of the unsent data is transferred from the current serving base station to a handover-target base station. Alternatively, one part of the unsent data is transmitted from the current serving base station to a central station which is a boundary station to an outer network while the other part of the unsent data is transferred from the current serving base station to a handover-target base station and is then transmitted to the central station. In this manner, a plurality of interfaces can be used to reduce the amount of data transferred through an inter-base station interface.

After the handover has been made, a new serving base station transmits merely the other part of the unsent data to the mobile station because the one part of the unsent data has been already transmitted from the old serving base station to the mobile station. Accordingly, as a whole, the unsent data can be transmitted to the mobile station at high speed, achieving shortened communication interruption duration on handover and improved quality of communication.

According to an embodiment of the present invention, the unsent data packets stored in a serving base station is divided to a plurality of interfaces by transmitting the unsent data to the mobile station in an ascending order of sequence number among the unsent data packets, while transferred to a new serving base station in a descending order of sequence number. Since it is necessary to transmit the packets assigned smaller sequence numbers to the mobile station earlier, these packets are directly transmitted to the mobile station. On the other hand, since the packets assigned larger sequence numbers have relatively larger time margins, they are transmitted to the mobile station via the new serving base station in a descending order of sequence number, then. In this manner, all the unsent packets can be transmitted and transferred with reliability. In general, the transmission rate of a radio interface and the transmission rate of an inter-base station interface are not always constant. The fluctuations in the difference between these transmission rates can be automatically absorbed by transmitting the unsent packets to the mobile station in an ascending order of sequence number and to the new serving base station in a descending order of sequence number. It is possible to have all the unsent packets arrive at the mobile station without losing any packet.

According to another embodiment of the present invention, in the case where the unsent data packets are transmitted to the mobile station in an ascending order of sequence number starting while transferred to the new serving base station in a descending order of sequence number, there may be the case where some of the unsent packets still remain even if approaching a handover activation time which is timing of switching the connection to the mobile station. In such a case, the order of transferring packets to the new serving base station is reversed to an ascending order of sequence number starting from the packet that is to be next transmitted to the mobile station. In such a manner, when the handover activation time approaches expiration, the order of transferring packets to the new serving base station is changed to an ascending order of sequence number. Accordingly, the packets which are necessary to be transmitted earlier can be transferred to the new serving base station, achieving shortened communication interruption duration on handover and improved quality of communication.

According to still another embodiment of the present invention, the transmission rate of a radio interface between the current serving base station and the mobile station and the transmission rate of an inter-base station interface are monitored and, based on these transmission rates, the handover activation time and how to divide the unsent data are adjusted. More specifically, a larger number of packets are provided to one of the radio interface and the inter-base station interface which has a higher transmission rate. Especially, consider the case where when the handover activation time approaches expiration, the order of transferring packets to the new serving base station is changed to an ascending order of sequence number. If the transmission rate of the radio interface is higher than that of the inter-base station interface, a larger number of packets are directly transmitted to the mobile station through the radio interface. On the other hand, if the transmission rate of the inter-base station interface is higher than that of the radio interface, a larger number of packets are transmitted to the new serving base station. In this manner, the optimal packet dividing can be made based on the transmission rates of the interfaces, achieving high-speed data transmission, shortened communication interruption duration and improved quality of communication on handover.

BRIEF DESCRIPTION OF THE DRAWINGS

FIG. 1 is a network structure diagram schematically showing a mobile communications system in general.

FIG. 2A is a sequence diagram showing conventional procedures for handover and downlink data transmission using data transfer between base stations.

FIG. 2B is a schematic diagram showing an order of transferring unsent packets stored at a serving base station.

FIG. 3 is a sequence diagram showing conventional procedures for handover and uplink data transmission using data transfer between base stations.

FIG. 5A is a schematic diagram showing a conventional order of transferring unsent packets over an inter-BTS interface.

FIG. 5B is a schematic diagram showing an order of transferring unsent packets over an inter-BTS interface in a data transfer method according to a first embodiment of the present invention.

FIG. 5C is a schematic diagram showing an order of transferring unsent packets over an inter-BTS interface in a data transfer method according to a second embodiment of the present invention.

FIG. 5D is a schematic diagram showing an order of transferring unsent packets over an inter-BTS interface in a data transfer method according to a third embodiment of the present invention.

FIG. 5E is a schematic diagram showing an order of transferring unsent packets over an inter-BTS interface in a data transfer method according to a fourth embodiment of the present invention.

FIG. 6 is a schematic block diagram showing a base station in a mobile communications system according to the present invention.

FIG. 7 is a sequence diagram showing procedures for handover and downlink data transmission according to the first embodiment of the present invention.

FIG. 8 is a sequence diagram showing procedures for handover and downlink data transmission according to the second embodiment of the present invention.

FIG. 9 is a sequence diagram showing procedures for handover and downlink data transmission according to the third embodiment of the present invention.

FIG. 10 is a sequence diagram showing procedures for handover and downlink data transmission according to the fourth embodiment of the present invention.

FIG. 11 is a sequence diagram showing procedures for handover and downlink data transmission according to a fifth embodiment of the present invention.

FIG. 12A is a schematic diagram showing a conventional order of transferring unsent uplink packets.

FIG. 12B is a schematic diagram showing an order of transferring unsent uplink packets in a data transfer method according to a sixth embodiment of the present invention.

FIG. 12C is a schematic diagram showing an order of transferring unsent uplink packets in a data transfer method according to a seventh embodiment of the present invention.

FIG. 12D is a schematic diagram showing an order of transferring unsent uplink packets in a data transfer method according to an eighth embodiment of the present invention.

FIG. 12E is a schematic diagram showing an order of transferring unsent uplink packets in a data transfer method according to a ninth embodiment of the present invention.

FIG. 13 is a sequence diagram showing procedures for handover and uplink data transmission according to the sixth embodiment of the present invention.

DETAILED DESCRIPTION OF THE PREFERRED EMBODIMENTS

1. First Mode

Figure 4B:
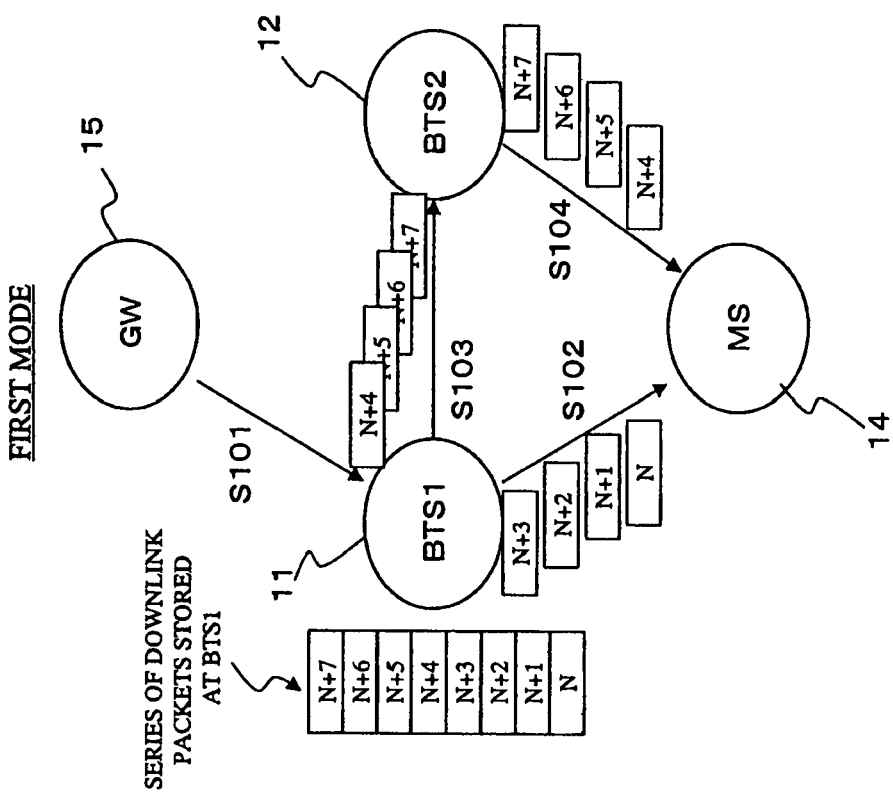
FIG. 4B is a diagram of a partial structure of a mobile communications system, to schematically show a method of data transfer at the time of handover according to a second mode of the present invention.
Figure 4A:
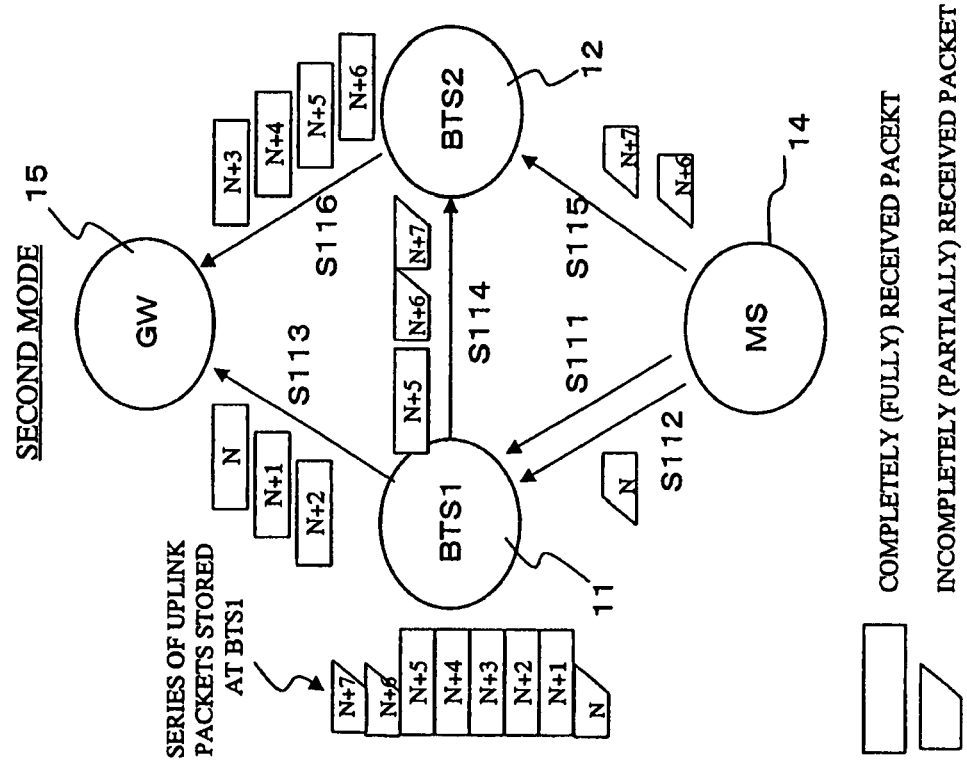
FIG. 4A is a diagram of a partial structure of a mobile communications system, to schematically show a method of data transfer at the time of handover according to a first mode of the present invention.

FIG. 4A is a diagram of a partial structure of a mobile communications system, to schematically show a method of data transfer at the time of handover according to a first mode of the present invention. Here, as in FIG. 1, it is assumed that a mobile station 14 is receiving data packets from a gateway 15 through a base station 11 which is currently its serving base station, and that a handover will be carried out from the base station 11 to a base station 12 (target base station). Data transfer between the base stations is performed through an interface XUB, and data transfer between each base station and the gateway 15 is performed through an interface XU.

First, the gateway 15 performs location registration management for each mobile station and keeps track of which base station, as the serving base station, each mobile station is communicating with. Therefore, when a packet destined for the mobile station 14 arrives from the Internet 16, the gateway 15 can forward the packet to the mobile station 14 via the current serving base station after assigning a sequence number to the packet. In addition, when a handover from the base station 11 to the base station 12 is decided for the mobile station 14, the gateway 15 updates location registration information so as to make the base station 12 the serving base station of the mobile station 14.

Referring to FIG. 4A, it is assumed that the current serving base station 11 has received packets D(N), D(N+1), ..., D(N+7) from the gateway 15 before a handover occurs but has not transmitted them yet (S101). Note that the number of packets does not need to be limited of course although the eight packets D(N) to D(N+7) are shown as an example for simplicity reason, and cases where a plurality of packets are stored similarly apply in general. Here, x of a data packet D(x) is a sequence number assigned by the gateway 15, where the larger x is, the later (the newer, in general) the packet is. In FIG. 4A, the packet D(N) is a front (first) packet and the packet D(N+7) is a backend (last) packet in this sequence.

When a handover is decided, the current serving base station 11 divides the stored unsent data packets D(N) to D(N+7) into a first group to transmit to the mobile station 14 and a second group to transfer to the base station 12. The serving base station 11 transmits those in the first group to the mobile station 14 through a radio interface (S102) and transfers those in the second group to the base station 12 through the inter-BTS interface XUB (S103).

For a method for dividing the data packets, the following scheme can be employed, for example. Specifically, the data packets are transmitted to the mobile station 14 in an ascending order of sequence number starting from the packet assigned the smallest sequence number among the data packets D(N) to D(N+7) (i.e., in the order of D(N), D(N+1), ...), while the data packets are transferred to the base station 12 in a descending order of sequence number starting from the packet assigned the largest sequence number among the data packets D(N) to D(N+7) (i.e., in the order of D(N+7), D(N+6), ...). While such data transmission is being carried out, the mobile station 14 establishes synchronization with the new serving base station 12. After synchronization has been established, the mobile station 14 wirelessly receives from the new serving base station 12 the packets (here, D(N+4), D(N+5), ...) subsequent to those really received wirelessly from the base station 11 (S104).

There are some other methods for dividing the unsent data packets at the base station 11, which will be described in the undermentioned embodiments. In any case, two transmission routes are used to transmit the unsent data packets: a route from the base station 11 to the mobile station 14, and a route from the base station 11, via the base station 12, to the mobile station 14. Thereby, the data packets unsent at the time of handover can be transmitted from the base station 11 to the mobile station 14 at high speed. Accordingly, it is possible to achieve high-speed data transmission at the time of handover, a reduction in the duration of a communication interruption, and enhanced quality of communication.

2. Second Mode

FIG. 4B is a diagram of a partial structure of a mobile communications system, to schematically show a method of data transfer at the time of handover according to a second mode of the present invention. Here, as in FIG. 1, it is assumed that a mobile station 14 is transmitting data packets to a gateway 15 through a base station 11 which is currently the serving base station, and that a handover will be carried out from the base station 11 to a base station 12 (target base station). Data transfer between the base stations is performed through an interface XUB, and data transfer between each base station and the gateway 15 is performed through an interface XU.

First, the gateway 15 performs location registration management for each mobile station and keeps track of which base station, as the serving base station, each mobile station is communicating with. In addition, when a handover from the base station 11 to the base station 12 is decided for the mobile station 14, the gateway 15 updates location registration information so as to make the base station 12 a serving base station of the mobile station 14.

Referring to FIG. 4B, before a handover occurs, the mobile station 14 sequentially transmits packets D(N), D(N+1), ..., D(N+7) (S111). However, it is assumed that some of the packets received at the serving base station 11 are incompletely (or partially) received packets. Here, it is assumed that the packets D(N), D(N+6) and D(N+7) are incompletely received packets. Hereinafter, an incompletely received packet is indicated by adding an asterisk, like "D*(N)", and is represented in the drawings by a sequence number in a trapezoid.

Note that the number of packets does not need to be limited of course although the eight packets D(N) to D(N+7) are shown as an example for simplicity reason, and cases where a plurality of packets are stored similarly apply in general. Here, x of a data packet D(x) is a sequence number assigned by the mobile station 14, where the larger x is, the later (the newer, in general) the packet is. In FIG. 4B, the packet D(N) is a front (first) packet and the packet D(N+7) is a backend (last) packet in this sequence.

When a handover is decided, the current serving base station 11 divides the stored unsent data packets D*(N), D(N+1) to D(N+5), D*(N+6), and D*(N+7) into a first group to transmit from itself and a second group to transfer to the target base station 12. As to the first group, the serving base station 11 receives again the packets corresponding the incompletely received packets from the mobile station 14 (S112) and, when all the received packets in the first group become complete, sequentially transmits them to the gateway 15 (S113). As to the second group on the other hand, the base station 11 transfers the packets to the base station 12 through the inter-BTS interface XUB (S114). After synchronization has been established with the mobile station 14, the base station 12 receives again the packets corresponding to the incompletely received packets from the mobile station 14 (S115) and, when all the received packets in the second group become complete, sequentially transmits them to the gateway 15 (S116).

For a method for dividing the data packets, the following scheme can be employed, for example. Specifically, the data packets to be transmitted from the base station 11 are checked in an ascending order of sequence number starting from the packet assigned the smallest sequence number (i.e., in the order of D*(N), D(N+1), ...), while the data packets are transferred to the base station 12 in a descending order of sequence number starting from the packet assigned the largest sequence number (i.e., in the order of D*(N+7), D*(N+6), ...).

In FIG. 4B, the base station 11 checks the data packets for an incompletely (or partially) received packet in an ascending order of sequence number starting from the packet assigned the smallest sequence number and, if an incompletely received packet is present, receives the corresponding packet again from the mobile station 14. Since the incompletely received packet D*(N) is present here, the corresponding packet is retransmitted by the mobile station 14. The base station 11 receives that packet and, when the received packets become all complete (here, D(N), D(N+1) and D(N+2)), sequentially transmits them to the gateway 15.

On the other hand, the base station 11 starts transferring the data packets to the target base station 12 in a descending order of sequence number starting from the packet assigned the largest sequence number. Here, the received packets D*(N+7), D*(N+6), ... are sequentially transferred to the base station 12. The base station 12 checks a series of the received packets for an incompletely received packet in an ascending order of sequence number starting from the packet assigned the smallest sequence number. If an incompletely received packet is present, the base station 12 receives the corresponding packet from the mobile station 14. Since the incompletely received packets D*(N+6) and D*(N+7) are present here, the corresponding packets are retransmitted by the mobile station 14. The base station 12 receives these packets and, if the received packets become all complete (here, D(N+3) to D(N+7)), transmits them in this order to the gateway 15.

There are some other methods for dividing the unsent data packets at the base station 11, which will be described in the undermentioned embodiments. In any case, two transmission routes are used to transmit the unsent data packets: a direct route from the base station 11 to the gateway 15, and a route from the base station 11, via the base station 12, to the gateway 15. Thereby, the data packets unsent at the time of handover can be transmitted from the base station 11 to the gateway 15 at high speed. Accordingly, it is possible to achieve high-speed data transmission at the time of handover, a reduction in the duration of a communication interruption, and enhanced quality of communication.

3. Outline of Embodiments in First Mode

FIG. 5A is a schematic diagram showing a conventional order of transferring unsent packets over an inter-BTS interface. FIG. 5B is a schematic diagram showing an order of transferring unsent packets over an inter-BTS interface in a data transfer method according to a first embodiment of the present invention. FIG. 5C is a schematic diagram showing an order of transferring unsent packets over an inter-BTS interface in a data transfer method according to a second embodiment of the present invention. FIG. 5D is a schematic diagram showing an order of transferring unsent packets over an inter-BTS interface in a data transfer method according to a third embodiment of the present invention. FIG. 5E is a schematic diagram showing an order of transferring unsent packets over an inter-BTS interface in a data transfer method according to a fourth embodiment of the present invention.

Referring to FIG. 5A, conventionally, unsent data packets D(N) to D(N+7) are transferred in this order through the inter-BTS interface XUB. On the other hand, the transmission procedures according to the embodiments of the present invention will be described in outline below.

3.1) First Embodiment

Referring to FIG. 5B, according to the first embodiment of the present invention, the unsent data packets are transmitted to the mobile station 14 through a radio interface in an ascending order of sequence number starting from the packet assigned the smallest sequence number among the unsent data packets D(N) to D(N+7) (in the direction of an arrow 201), while transferred to the base station 12 through the inter-BTS interface XUB in a descending order of sequence number starting from the packet assigned the largest sequence number among the unsent data packets D(N) to D(N+7) (in the direction of an arrow 202).

Since the packets assigned smaller sequence numbers are transmitted to the mobile station 14 earlier, the duration of a communication interruption can be reduced. Moreover, since the packets assigned larger sequence numbers, which have relatively larger time margins, are transferred to the base station 12 in a descending order of sequence number, it is possible to avoid loss of data and a communication interruption. In general, the transmission rate of a radio interface and the transmission rate of an inter-BTS interface are not always constant. The fluctuations in the difference between these transmission rates can be automatically absorbed by transmitting the unsent packets to the mobile station 14 in an ascending order of sequence number and to the target base station 12 in a descending order of sequence number. It is possible to have all the unsent packets arrive at the mobile station 14 without losing any packet.

3.2) Second Embodiment

Referring to FIG. 5C, according to the second embodiment of the present invention, the unsent data packets are transmitted to the mobile station 14 in an ascending order of sequence number starting from the packet assigned the smallest sequence number among the unsent data packets D(N) to D(N+7) (in the direction of an arrow 201), while transferred to the base station 12 in a descending order of sequence number starting from the packet assigned the largest sequence number among the unsent data packets D(N) to D(N+7) (in the direction of an arrow 202). However, in the case where some of the unsent packets still remain even if a HO activation time AT approaches expiration, the base station 11 changes the order of transferring packets to the base station 12 to an ascending order of sequence number starting from the packet that is to be next transmitted to the mobile station 14 (in the direction of an arrow 203). In the example shown in FIG. 5C, from the packet D(N+2) subsequent to the packets D(N) and D(N+1) that have been transmitted to the mobile station 14, the packets are transferred to the base station 12 through the inter-BTS interface XUB.

When the transmission rate of the radio interface between the base station 11 and the mobile station 14 has dropped by more than expected, there are some cases where unsent packets remain even if the HO activation time AT approaches expiration. In this case, it is desirable to reduce the duration of a communication interruption by transmitting a packet assigned a smaller sequence number to the mobile station 14 sooner. Therefore, according to the second embodiment, when the HO activation time AT approaches expiration, the order of transferring packets to the base station 12 is changed to an ascending order of sequence number (the direction of the arrow 203), in which thereafter the packets are transferred to the base station 12. Note that specific examples of calculation of the HO activation time AT and detection of the HO activation time AT approaching expiration will be described later.

3.3) Third Embodiment

Referring to FIG. 5D, according to the third embodiment of the present invention, the unsent data packets are transmitted to the mobile station 14 in an ascending order of sequence number starting from the packet assigned the smallest sequence number among the unsent data packets D(N) to D(N+7) (in the direction of an arrow 201), while transferred to the base station 12 in an ascending order of sequence number starting from the packet at a calculated transfer start point TSP (in the direction of an arrow 204).

The transfer start point TSP can be determined as follows. The transmission rate $R_{AIR}$ of the radio interface between the base station 11 and the mobile station 14 and the transmission rate $R_{XUB}$ of the interface XUB between the base stations 11 and 12 are monitored, and the transfer start point TSP is calculated based on these transmission rates $R_{AIR}$ and $R_{XUB}$ and the total quantity B of the unsent packets to transmit. In FIG. 5D, the transfer start point TSP is the packet D(N+3). A method for detecting or estimating the transmission rates and a method for calculating the transfer start point will be described later.

When the transmission rate $R_{AIR}$ of the radio interface and the transmission rate $R_{XUB}$ of the inter-BTS interface XUB have both dropped in particular, it is desirable to transmit a packet assigned a smaller sequence number to the mobile station 14 earlier, in order to avoid a communication interruption. According to the third embodiment, the transmission to the mobile station 14 and the transfer to the base station 12 are each carried out in an ascending order of the sequence numbers of the unsent packets. Accordingly, a packet assigned a smaller sequence number is transmitted to the mobile station 14 earlier, and the duration of a communication interruption can be reduced. Additionally, since the packets are transmitted (or transferred) in an ascending order of sequence number in each case, the control performed on the receiving side can be simplified.

3.4) Fourth Embodiment

Referring to FIG. 5E, according to the fourth embodiment of the present invention, the unsent data packets are transmitted to the mobile station 14 in an ascending order of sequence number starting from the packet assigned the smallest sequence number among the unsent data packets D(N) to D(N+7) (in the direction of an arrow 201), while transferred to the base station 12 in an ascending order of sequence number starting from the packet at a calculated transfer start point TSP (in the direction of an arrow 204). The transfer start point is similar to that of the third embodiment.

However, in the case where some of the unsent packets remain even if a HO activation time AT approaches expiration, the base station 11 changes the order of transferring packets to the base station 12 to an ascending order of sequence number starting from the packet that is to be next transmitted to the mobile station 14 (in the direction of an arrow 205). In the example shown in FIG. 5E, the packets D(N+2) to D(N+4), subsequent to the packets D(N) and D(N+1) that have been transmitted to the mobile station 14, are transferred to the base station 12 through the inter-BTS interface XUB.

When the transmission rate of the radio interface between the base station 11 and the mobile station 14 has dropped by more than expected, there are some cases where the packet transmission has not progressed as much up to the transfer start point TSP as calculated, and unsent packets to be transmitted to the mobile station 14 remain even if the HO activation time AT approaches expiration. In this case, it is desirable to reduce the duration of a communication interruption by transmitting a packet assigned a smaller sequence number to the mobile station 14 sooner. Therefore, according to the fourth embodiment, when the HO activation time approaches expiration, the order of transferring packets to the base station 12 is changed to an ascending order of sequence number (the direction of the arrow 205), in which thereafter the packets are transferred to the base station 12. Note that specific examples of calculation of the HO activation time AT and detection of the HO activation time AT approaching expiration will be described later.

3.5) Fifth Embodiment

When the transmission and transfer of the unsent packets from the base station 11 to the mobile station 14 and base station 12 have finished sooner in any one of the above-described embodiments, the base station 11 can move up the originally set expiration of the HO activation time AT by sending the mobile station 14 a HO command (AT=NOW) to execute a handover. Thereby, completion of the handover can be advanced. Accordingly, it is possible to further reduce the duration of a communication interruption and to enhance the quality of communication.

3.6) Modified Examples

For a modified example of the first embodiment, when the transmission rate $R_{AIR}$ of the radio interface between the base station 11 and the mobile station 14 has dropped greatly in comparison with the transmission rate $R_{XUB}$ of the inter-BTS interface XUB, the base station 11 can make sequential detour-transmissions through the inter-BTS interface XUB, starting from a packet to be transmitted earlier, in contrast to the first embodiment. In other words, the base station 11 also can transfer the unsent data packets through the inter-BTS interface XUB in an ascending order of sequence number starting from the packet assigned the smallest sequence number among the unsent data packets D(N) to D(N+7) (in the direction of the arrow 201), while transmitting the unsent data packets to the mobile station 14 through the radio interface in a descending order of sequence number starting from the packet assigned the largest sequence number among the unsent data packets D(N) to D(N+7) (in the direction of the arrow 202).

For a modified example of the second embodiment, in the case where unsent packets to be transmitted to the mobile station 14 remain even if the HO activation time AT approaches expiration, the transfer to the base station 12 may be started from the packet at a transfer start point TSP in an ascending order of sequence number (in the direction of the arrow 203). The transfer start point TSP is determined depending on how many packets will have been transmitted to the mobile station 14 before the transfer start point TSP, which is similar to that of the third embodiment.

For a modified example of the fourth embodiment, in the case where unsent packets to be transmitted to the mobile station 14 remain even if the HO activation time AT approaches expiration, the order of transferring packets to the base station 12 may be changed to a descending order of sequence number starting from the packet immediately before the transfer start point TSP (in the reverse direction to the arrow 205).

4. Functional Configuration of Base Station

FIG. 6 is a schematic block diagram showing a base station in a mobile communications system according to the present invention. The above-mentioned base stations 11 and 12 basically have the same functionality, as well as other base stations not shown in the drawings. Hereinafter, description will be focused on the functionality related to the present invention.

The base station (BTS) has a buffer section 301 for storing downlink data packets DD(N) to DD(N+M), uplink data packets DU(N) to DU(N+L), and other packets. The buffer section 301 is managed by a control section 303 based on a buffer management table 302.

The control section 303 includes a HO controller 304 and a divide controller 305, which operate in concert to perform scheduling of transmission and reception of packets, divide of unsent packets according to any of the embodiments, which will be described in detail later, and control of the transmission order, using the buffer management table 302.

Radio communications between the base station and mobile stations are performed by a radio transceiver 306. The radio transceiver 306 is controlled by the control section 303. Moreover, communication with the gateway is carried out through a XU interface 307, and communications with other base stations are carried out through a XUB interface 308.

The HO controller 304 sets a HO activation time AT by using the transmission rate $R_{AIR}$ of the radio interface and the transmission rate $R_{XUB}$ of the inter-BTS interface XUB, which will be described later, and sets a timer (not shown) for this HO activation time AT.

The control section 303 can estimate the transmission rate $R_{AIR}$ of the radio interface by controlling the radio transceiver 306 and using the time required for packet transmission/reception to/from a mobile station, the status of variation in the channel quality of the radio interface, and the like. Moreover, the control section 303 can estimate the transmission rate $R_{XUB}$ of the inter-BTS interface XUB with the other-end base station (here, base station 12) by controlling the XUB interface 308 and using a transmission time and reception time of packets transmitted and received to/from the base station 12 at an appropriate occasion or periodically, and the like.

5. First Embodiment

FIG. 7 is a sequence diagram showing procedures for handover and downlink data transmission according to the first embodiment of the present invention. First, when the strength of a radio signal received from the current serving base station 11 becomes lower, the mobile station 14 evaluates the necessity of a handover (S401) and searches for a new connectable base station. As a result of the search, the mobile station 14 makes a handover (HO) request to the base station 11, for new connection to the base station 12 (S403). At this point in time, it is assumed that the base station 11 has received from the gateway 15 packets D(N) to D(N+7) destined for the mobile station 14, which have been stored in the buffer section 301 (S402).

When the mobile station 14 sends the HO request to the serving base station 11, the respective HO controllers 304 of the base station 11 and the target base station 12 make mutual handover adjustment for the mobile station 14 to decide the handover (S404).

When the handover is decided, the HO controller 304 of the base station 11 calculates a HO activation time AT by using the monitored transmission rates $R_{AIR}$ and $R_{XUB}$ and sends the mobile station 14 a HO command in which the HO activation time AT is set (S405). Assuming that this point in time is T1, the timer for the HO activation time AT is started at the time point T1 in each of the mobile station 14 and the base station 11 (S406).

When the HO command is sent to the mobile station 14, the divide controller 305 of the base station 11 controls the buffer management table 302 and starts transferring the unsent data packets to the base station 12 through the inter-BTS interface XUB, in a descending order of sequence number starting from the packet assigned the largest sequence number among the unsent data packets D(N) to D(N+7) (S407). In parallel with this, the divide controller 305 controls the buffer management table 302 and starts transmitting the unsent data packets to the mobile station 14 through the radio interface, in an ascending order of sequence number starting from the packet assigned the smallest sequence number among the unsent data packets D(N) to D(N+7) (S408). Here, the data packets D(N+7) to D(N+4) are transferred to the base station 12, and the data packets D(N) to D(N+3) are transmitted to the mobile station 14.

When the timer for the HO activation time AT expires, the divide controller 305 of the base station 11 notifies the base station 12 of the sequence number (here, (N+4)) of the packet next to the last packet successfully transmitted to the mobile station 14 (S409). With this notification, the new serving base station 12 knows which packet the transmission to the mobile station 14 should be started from.

When the timer for the HO activation time AT has expired, the mobile station 14 establishes physical-layer synchronization with the target base station 12 (S410). Thereafter, the gateway 15 updates the serving base station of the mobile station 14 from the base station 11 to the base station 12, based on notifications from the base stations 11 and 12 (S411). The control section 303 of the base station 12 transmits the remaining unsent packets D(N+4) to D(N+7) to the mobile station 14 (S412). If a new packet D(N+8) and subsequent packets arrive from the gateway 15, the new serving base station 12 transmits the packet D(N+8) and subsequent packets to the mobile station 14, following the packet D(N+7).

5.1) HO Activation Time AT

In the first embodiment, the HO activation time AT can be set as follows. As described above, every one of the unsent data packets D(N) to D(N+7) is transmitted to the mobile station 14 or transferred to the base station 12 within the HO activation time AT. Therefore, assuming that B is the total quantity of the unsent data packets D(N) to D(N+7), the HO activation time AT can be calculated by using the transmission rate $R_{AIR}$ of the radio interface between the base station 11 and the mobile station 14 and the transmission rate $R_{XUB}$ of the interface XUB between the base stations 11 and 12, as follows:

$$AT = m*B/(R_{AIR}+R_{XUB})$$

where m is a constant representing a margin.

Note that, not through such calculation, the HO activation time AT may be set at a predetermined fixed value.

5.2) Transmission Rate of Interface

The transmission rate $R_{AIR}$ of the radio interface can be detected as follows. The control section 303 of the base station 11 controls the radio transceiver 306, transmits a packet to a selected mobile station, and measures the time spent until receiving a response packet from the mobile station. Using this measured time, or the difference between a time of origin and a time of receipt of, for example, a HO request from the mobile station, the transmission rate at the present point in time can be detected.

Alternatively, it is also possible to estimate the transmission rate of the radio interface at a next point in time, by using these detected temporal data and the recent status of variation in the channel quality CQI of the radio interface. For example, the transmission rate at a next point in time can be calculated by using the following equation:

$$R_{AIR}(n) = R_{AIR}(n-1) + k1*[CQI(n) - CQI(n-1)]$$

where $R_{AIR}(n)$ is the transmission rate during a future time range of n to (n+1), estimated at the present point in time n; $R_{AIR}(n-1)$ is the transmission rate measured during a past time range of (n-1) to n; CQI(n) is the channel quality information reported at the present point in time n from the radio transceiver 306; CQI(n-1) is the channel quality information reported at the previous point in time (n-1); k1 is a system parameter.

The transmission rate $R_{XUB}$ of the inter-BTS interface XUB can be estimated as follows. The control section 303 controls the XUB interface 308 and transmits a packet to and receives a packet from a base station at the other end of communication, when appropriate or periodically. Using a time of origin and a time of receipt of these packets or the like, the transmission rate $R_{XUB}$ can be calculated, for example, as follows:

$$R_{XUB} = k2*S/[T(HORes) - T(HOReq)]$$

where k2 is a system parameter; S is the sum of the numbers of bits of a HO request and a HO response; T(HORes) is the time at which a HO response arrives at the base station 11; T(HOReq) is the time at which a HO request is transmitted from the base station 11.

6. Second Embodiment

FIG. 8 is a sequence diagram showing procedures for handover and downlink data transmission according to the second embodiment of the present invention. First, when the strength of a radio signal received from the current serving base station 11 becomes weaker, the mobile station 14 evaluates the necessity of a handover (S401) and searches for a new connectable base station. As a result of the search, the mobile station 14 makes a HO request to the base station 11, for new connection to the base station 12 (S403). At this point in time, it is assumed that the base station 11 has received from the gateway 15 packets D(N) to D(N+7) destined for the mobile station 14, which have been stored in the buffer section 301 (S402).

When the mobile station 14 sends the HO request to the serving base station 11, the respective HO controllers 304 of the base station 11 and the target base station 12 make mutual handover adjustment for the mobile station 14 to decide a handover (S404).

When the handover is decided, the HO controller 304 of the base station 11 calculates a HO activation time AT by using the monitored transmission rates $R_{AIR}$ and $R_{XUB}$ and sends the mobile station 14 a HO command in which the HO activation time AT is set (S405). Assuming that the current point in time is T1, the timer for the HO activation time AT is started at the time point T1 in each of the mobile station 14 and the base station 11 (S406). Note that a method for calculating the HO activation time AT is as described in the section 5.1), but the HO activation time AT is not only determined through such calculation but may be set at a predetermined fixed value.

When the HO command is sent to the mobile station 14, the divide controller 305 of the base station 11 controls the buffer management table 302 and starts transferring the unsent data packets to the base station 12 through the inter-BTS interface XUB, in a descending order of sequence number starting from the packet assigned the largest sequence number among the unsent data packets D(N) to D(N+7) (S407). In parallel with this, the divide controller 305 controls the buffer management table 302 and starts transmitting the unsent data packets to the mobile station 14 through the radio interface, in an ascending order of sequence number starting from the packet assigned the smallest sequence number among the unsent data packets D(N) to D(N+7) (S408).

The divide controller 305 of the base station 11 checks the difference between the current time and the expiration point of the HO activation time AT, as well as the quantity of the unsent data packets remaining in the buffer section 301. For example, an approaching point can be set at a time point T2 that is a predetermined period of time before the HO activation time AT expires.

When a predetermined quantity or more of the unsent data packets remain even if it is the time point T2 where the HO activation time AT approaches expiration (S501), the divide controller 305 of the base station 11 controls the buffer management table 302 and changes the order of transferring packets to the base station 12 to an ascending order of sequence number starting from the packet that is to be next transmitted to the mobile station 14 (S502). Thereby, after the time point T2, the base station 11 transfers the remaining unsent data packets D(N+2) to D(N+5) to the base station 12. Since the packets assigned smaller sequence numbers have already been transmitted to the mobile station 14 from the base station 11, even if the packets D(N+2) to D(N+5), which are assigned larger sequence numbers, fail to be transmitted, they can be transferred by a time point T3 that is later than the expiration of the HO activation time AT, without interrupting the communication.

When the timer for the HO activation time AT expires, the divide controller 305 of the base station 11 notifies the base station 12 of the sequence number (here, (N+2)) of the packet next to the last packet successfully transmitted to the mobile station 14 (S503). With this notification, the HO controller 304 of the base station 12 knows which packet the transmission to the mobile station 14 should be started from.

When the timer for the HO activation time AT has expired, the mobile station 14 establishes physical-layer synchronization with the target base station 12 (S504). Thereafter, the gateway 15 updates the serving base station of the mobile station 14 from the base station 11 to the base station 12, based on notifications from the base stations 11 and 12 (S505). The HO controller 304 of the base station 12 transmits the remaining unsent data packets D(N+2) to D(N+7) to the mobile station 14 (S506). If a new packet D(N+8) and subsequent packets arrive from the gateway 15 (S507), the new serving base station 12 transmits the packet D(N+8) and subsequent packets to the mobile station 14, following the packet D(N+7).

As described above, according to the second embodiment, when the HO activation time AT approaches expiration, the order of transferring packets to the base station 12 is changed to an ascending order of sequence number, in which thereafter the packets are transferred to the base station 12. Therefore, even if the transmission rate of one of the interfaces drops, no data will be lost, and no communication interruption will occur.

7. Third Embodiment

FIG. 9 is a sequence diagram showing procedures for handover and downlink data transmission according to the third embodiment of the present invention. First, when the strength of a radio signal received from the current serving base station 11 becomes weaker, the mobile station 14 evaluates the necessity of a handover (S401) and searches for a new connectable base station. As a result of the search, the mobile station 14 makes a HO request to the base station 11, for new connection to the base station 12 (S403). At this point in time, it is assumed that the base station 11 has received from the gateway 15 packets D(N) to D(N+7) destined for the mobile station 14, which have been stored in the buffer section 301 (S402).

When the mobile station 14 sends the HO request to the serving base station 11, the respective HO controllers 304 of the base station 11 and the target base station 12 make mutual handover adjustment for the mobile station 14 to decide a handover (S404).

When the handover is decided, the HO controller 304 of the base station 11 calculates a HO activation time AT by using the monitored transmission rates $R_{AIR}$ and $R_{XUB}$ and sends the mobile station 14 a HO command in which the HO activation time AT is set (S405). Note that the HO activation time AT is not only determined through such calculation but may be set at a predetermined fixed value. The timer for the HO activation time AT is started at a time point T1 in each of the mobile station 14 and the base station 11 (S601).

Based on the transmission rate $R_{AIR}$ of the radio interface with the mobile station 14, the transmission rate $R_{XUB}$ of the interface XUB with the base station 12, and the total quantity B of the unsent packets to transmit, the divide controller 305 of the base station 11 calculates a transfer start point TSP, which corresponds to the number of packets estimated to be successfully transmitted to the mobile station 14 through the radio interface (S602).

When the transfer start point TSP is determined (here, the number of packets estimated to be successfully transmitted=4), the divide controller 305 of the base station 11 controls the buffer management table 302 and starts transmitting the unsent data packets to the mobile station 14 through the radio interface, in an ascending order of sequence number starting from the packet assigned the smallest sequence number among the unsent data packets D(N) to D(N+7) (S603). In parallel with this, the divide controller 305 of the base station 11 starts transferring the unsent data packets to the base station 12 through the inter-BTS interface XUB, in an ascending order of sequence number starting from the packet next to the last one of the packets estimated to be successfully transmitted (S604). Here, the data packets D(N) to D(N+3) are transmitted in this order to the mobile station 14, and the data packets D(N+4) to D(N+7) are transferred in this order to the base station 12.

When the timer for the HO activation time AT expires, the divide controller 305 of the base station 11 notifies the base station 12 of the sequence number (here, (N+4)) of the packet next to the last packet successfully transmitted to the base station 14 (S605). With this notification, the new serving base station 12 knows which packet the transmission to the mobile station 14 should be started from.

When the timer for the HO activation time AT has expired, the mobile station 14 establishes physical-layer synchronization with the target base station 12 (S606). Thereafter, the gateway 15 updates the serving base station of the mobile station 14 from the base station 11 to the base station 12, based on notifications from the base stations 11 and 12 (S607). The control section 303 of the base station 12 transmits the remaining unsent packets D(N+4) to D(N+7) to the mobile station 14 (S608). If a new packet D(N+8) and subsequent packets arrive from the gateway 15 (S609), the new serving base station1 12 transmits the packet D(N+8) and subsequent packets to the mobile station 14, following the packet D(N+7).

7.1) Transfer Start Point: TSP

The transfer start point TSP, which corresponds to the number of packets estimated to be successfully transmitted to the mobile station 14 through the radio interface, can be thought of as the ratio of the transmission rate of the radio interface to the entire transmission rate, based on the reason that all the unsent packets should be sent off through the interface XUB and the radio interface within a period of time, and can be calculated as follows:

$$TSP = r*B*R_{AIR}/(R_{AIR}+R_{XUB})$$

where r is a constant representing a margin, and B is the total quantity of the unsent data packets.

The above equation for calculating the transfer start point TSP is premised on a variable HO activation time AT, which is represented as follows:

$$AT*R_{AIR} + AT*R_{XUB} = r*B$$

$$AT = r*B/(R_{AIR}+R_{XUB}).$$

That is, the HO activation time AT here is determined so that some (r*B) of the unsent packets should be sent off through the radio interface and the interface XUB by the expiration of the HO activation time AT.

However, if the HO activation time AT is fixed, the transfer start point TSP can also be calculated as follows:

$$TSP = q*B*R_{AIR}*AT$$

where q is a constant representing a margin.

7.2) HO Activation Time AT

The above-described transfer start point TSP is calculated on the premise that all the unsent packets should be sent off through the interface XUB and the radio interface within a period of time. However, if the transfer start point TSP is determined not on this premise but based on other conditions, the HO activation time AT can also be set as follows. Specifically, since the packets at and after the transfer start point TSP are transferred to the base station 12 through the interface XUB and the packets before the transfer start point TSP are transmitted to the mobile station 14 through the radio interface, the HO activation time AT is set by selecting the longer one of the respective transmission times. More specifically, referring to FIG. 5D, the HO activation time AT can be set as follows:

$$AT = \max(C/R_{XUB}, D/R_{AIR})$$

where C is the quantity of the packets at and after the transfer start point TSP to be transferred to the base station 12 through the interface XUB, and D is the quantity of the packets before the transfer start point TSP to be transmitted to the mobile station 14 through the radio interface. Note that the HO activation time AT is not only determined through such calculation but may be set at a predetermined fixed value.

8. Fourth Embodiment

FIG. 10 is a sequence diagram showing procedures for handover and downlink data transmission according to the fourth embodiment of the present invention. First, when the strength of a radio signal received from the current serving base station 11 becomes weaker, the mobile station 14 evaluates the necessity of a handover (S401) and searches for a new connectable base station. As a result of the search, the mobile station 14 makes a HO request to the base station 11, for new connection to the base station 12 (S403). At this point in time, it is assumed that the base station 11 has received from the gateway 15 packets D(N) to D(N+7) destined for the mobile station 14, which have been stored in the buffer section 301 (S402).

When the mobile station 14 sends the HO request to the serving base station 11, the respective HO controllers 304 of the base station 11 and the target base station 12 make mutual handover adjustment for the mobile station 14 to decide a handover (S404).

When the handover is decided, the HO controller 304 of the base station 11 calculates a HO activation time AT by using the monitored transmission rates $R_{AIR}$ and $R_{XUB}$ and sends the mobile station 14 a HO command in which the HO activation time AT is set (S405). Note that the HO activation time AT is not only determined through such calculation but may be set at a predetermined fixed value. The timer for the HO activation time AT is started at a time point T1 in each of the mobile station 14 and the base station 11 (S601). A method for calculating the HO activation time AT is as described in the section 5.1).

Moreover, based on the transmission rate $R_{AIR}$ of the radio interface with the mobile station 14, the transmission rate $R_{XUB}$ of the interface XUB with the base station 12, and the total quantity B of the unsent packets to transmit, the divide controller 305 of the base station 11 calculates a transfer start point TSP, which corresponds to the number of packets estimated to be successfully transmitted to the mobile station 14 through the radio interface (S602). A method for calculating the transfer start point TSP is as described in the section 7.1).

When the transfer start point TSP is determined (here, the number of packets estimated to be successfully transmitted=4), the divide controller 305 of the base station 11 controls the buffer management table 302 and starts transmitting the unsent data packets to the mobile station 14 through the radio interface, in an ascending order of sequence number starting from the packet assigned the smallest sequence number among the unsent data packets D(N) to D(N+7) (S603). In parallel with this, the divide controller 305 of the base station 11 starts transferring the unsent data packets to the base station 12 through the inter-BTS interface XUB, in an ascending order of sequence number starting from the packet next to the last one of the packets estimated to be successfully transmitted (S604). Here, the data packets D(N) and D(N+1) are transmitted in this order to the mobile station 14, and the data packets D(N+4) to D(N+5) are transferred in this order to the base station 12.

The divide controller 305 of the base station 11 checks the difference between the current time and the expiration point of the HO activation time AT, as well as the quantity of the unsent data packets remaining in the buffer section 301. For example, an approaching point can be set at a time point T2 that is a predetermined period of time before the HO activation time AT expires.

When a predetermined quantity or more of the unsent data packets remain even if it is the time point T2 where the HO activation time AT approaches expiration (S701), the divide controller 305 of the base station 11 controls the buffer management table 302 and changes the order of transferring packets to the base station 12 to an ascending order of sequence number starting from the packet that is to be next transmitted to the mobile station 14 (S702). Thereby, after the time point T2, the base station 11 sequentially transfers the remaining unsent data packets D(N+2), D(N+3), D(N+6), and D(N+7) to the base station 12. Since the packets assigned smaller sequence numbers have already been transmitted to the mobile station 14 from the base station 11, the packets D(N+2) and the others, which are assigned larger sequence numbers, can be transferred without interrupting the communication, even after the HO activation time AT expires (here, at a time point T3).

When the timer for the HO activation time AT expires, the divide controller 305 of the base station 11 notifies the base station 12 of the sequence number (here, (N+2)) of the packet next to the last packet successfully transmitted to the mobile station 14 (S703). With this notification, the new serving base station 12 knows which packet the transmission to the mobile station 14 should be started from.

When the timer for the HO activation time AT has expired, the mobile station 14 establishes physical-layer synchronization with the target base station 12 (S704). Thereafter, the gateway 15 updates the serving base station of the mobile station 14 from the base station 11 to the base station 12, based on notifications from the base stations 11 and 12 (S705). The control section 303 of the base station 12 sequentially transmits the remaining unsent packets D(N+2) to D(N+7) to the mobile station 14 (S706). If a new packet D(N+8) and subsequent packets arrive from the gateway 15 (S707), the new serving base station1 12 transmits the packet D(N+8) and subsequent packets to the mobile station 14, following the packet D(N+7).

As described above, according to the fourth embodiment, the transfer start point TSP, which corresponds to the number of packets estimated to be successfully transmitted to the mobile station 14 through the radio interface, is calculated. However, in the case where the transmission rate of the radio interface drops by more than expected and the packet transmission has not progressed as much up to the transfer start point TSP as calculated, the order of transferring packets to the base station 12 is changed to an ascending order of sequence number when the HO activation time AT approaches expiration, and the packets are transferred to the base station 12 in this ascending order. Thereby, a packet assigned a smaller sequence number is transmitted to the mobile station 14 sooner, and accordingly, the duration of a communication interruption can be reduced.

9. Fifth Embodiment

FIG. 11 is a sequence diagram showing procedures for handover and downlink data transmission according to the fifth embodiment of the present invention. First, when the strength of a radio signal received from the current serving base station 11 becomes weaker, the mobile station 14 evaluates the necessity of a handover (S401) and searches for a new connectable base station. As a result of the search, the mobile station 14 makes a HO request to the base station 11, for new connection to the base station 12 (S403). At this point in time, it is assumed that the base station 11 has received from the gateway 15 packets D(N) to D(N+7) destined for the mobile station 14, which have been stored in the buffer section 301 (S402).

When the mobile station 14 sends the HO request to the serving base station 11, the respective HO controllers 304 of the base station 11 and the target base station 12 make mutual handover adjustment for the mobile station 14 to decide a handover (S404).

When the handover is decided, the HO controller 304 of the base station 11 calculates a HO activation time AT by using the monitored transmission rates $R_{AIR}$ and $R_{XUB}$ and sends the mobile station 14 a HO command in which the HO activation time AT is set (S405). Note that the HO activation time AT is not only determined through such calculation but may be set at a predetermined fixed value. The timer for the HO activation time AT is started at this point in time in each of the mobile station 14 and the base station 11 (S406).

When the HO command is sent to the mobile station 14, the divide controller 305 of the base station 11 controls the buffer management table 302 and starts transferring the unsent data packets to the base station 12 through the inter-BTS interface XUB, in a descending order of sequence number starting from the packet assigned the largest sequence number among the unsent data packets D(N) to D(N+7) (S407). In parallel with this, the divide controller 305 controls the buffer management table 302 and starts transmitting the unsent data packets to the mobile station 14 through the radio interface, in an ascending order of sequence number starting from the packet assigned the smallest sequence number among the unsent data packets D(N) to D(N+7) (S408). Here, the data packets D(N+7) to D(N+4) are transferred to the base station 12, and the data packets D(N) to D(N+3) are transmitted to the mobile station 14.

The divide controller 305 of the base station 11 checks whether or not every one of the unsent data packets D(N) to D(N+7) in the buffer section 301 has been transmitted to the mobile station 14 or transferred to the base station 12. If the transmission and transfer of all the unsent data packets have been completed before the timer for the HO activation time AT expires, the HO controller 304 sends the mobile station 14 a HO command (AT=NOW), which is a command to execute a handover immediately (S801). In addition, when the HO command (AT=NOW) is sent, the divide controller 305 notifies the base station 12 of the sequence number (here, (N+4)) of the packet next to the last packet successfully transmitted to the mobile station 14 (S802).

Upon receipt of the HO command (AT=NOW), the mobile station 14 establishes physical-layer synchronization with the target base station 12 (S803). In other words, the expiration of the HO activation time AT is moved up by the HO command (AT=NOW) (S804).

When synchronization is established between the mobile station 14 and the base station 12, the gateway 15 updates the serving base station of the mobile station 14 from the base station 11 to the base station 12, based on notifications from the base stations 11 and 12 (S805). The control section 303 of the base station 12 transmits the remaining packets D(N+4) to D(N+7) to the mobile station 14 (S806). If a new packet D(N+8) and subsequent packets arrive from the gateway 15 (S807), the new serving base station 12 transmits the packet D(N+8) and subsequent packets to the mobile station 14, following the packet D(N+7).

As described above, according to the fifth embodiment, the HO command (AT=NOW) is sent to the mobile station 14, whereby the initially scheduled expiration of the HO activation time AT can be moved up, and consequently, the completion of the handover can be advanced.

Although FIG. 11 shows the procedures according to the first embodiment, the fifth embodiment similarly applies when the procedures according to the third embodiment shown in FIG. 9 are used. Using the procedures according to the third embodiment as well, the initially set expiration of the HO activation time AT can be moved up due to the high-speed transmission of the unsent packets.

10. Outline of Embodiments in Second Mode

According to the second mode of the present invention, as shown in FIG. 4B as an example, a series of the packets including incompletely (or partially) received packets, stored at the base station 11, can be transmitted to the gateway 15 at high speed by using two transmission routes: a direct route from the base station 11 to the gateway 15, and a route from the base station 11, via the base station 12, to the gateway 15. A method for dividing the unsent data packets stored at the base station 11 into two groups corresponding to the two routes can be considered as in each of the embodiments in the first mode shown in FIGS. 5B to 5E.

FIG. 12A is a schematic diagram showing a conventional order of transferring unsent uplink packets. FIG. 12B is a schematic diagram showing an order of transferring unsent uplink packets in a data transfer method according to a sixth embodiment of the present invention. FIG. 12C is a schematic diagram showing an order of transferring unsent uplink packets in a data transfer method according to a seventh embodiment. FIG. 12D is a schematic diagram showing an order of transferring unsent uplink packets in a data transfer method according to an eighth embodiment of the present invention. FIG. 12E is a schematic diagram showing an order of transferring unsent uplink packets in a data transfer method according to a ninth embodiment of the present invention.

Referring to FIG. 12A, conventionally, unsent uplink data packets D(N) to D(N+7) are transferred in this order to the handover-target base station 12 through the inter-BTS interface XUB. On the other hand, the transmission procedures according to the embodiments of the present invention will be described in outline below.

10.1) Sixth Embodiment

Referring to FIG. 12B, according to the sixth embodiment of the present invention, for unsent data packets D(N) to D(N+7) including incompletely received packets, the packets corresponding to the incompletely received packets are retransmitted from the mobile station 14 through the radio interface, in an ascending order of sequence number starting from the packet assigned the smallest sequence number among the unsent data packets D(N) to D(N+7) (in the direction of an arrow 901). When the received packets become all complete, they are transmitted to the gateway 15.

On the other hand, the unsent data packets including the incompletely received packets are transferred to the base station 12 through the inter-BTS interface XUB, in a descending order of sequence number starting from the packet assigned the largest sequence number among the unsent data packets D(N) to D(N+7) (in the direction of an arrow 902). The base station 12 checks a series of the received packets for an incompletely received packet in an ascending order of sequence number starting from the packet assigned the smallest sequence number and, if an incompletely received packet is present, receives the corresponding packet again from the mobile station 14. When the base station 12 receives that packet and thus makes the received packets all complete, then the base station 12 transmits them in sequence order to the gateway 15.

For the incompletely received packets, a corresponding packet assigned a smaller sequence number is retransmitted from the mobile station 14 earlier. Therefore, the duration of a communication interruption can be reduced. Moreover, the packets assigned larger sequence numbers, which have relatively larger time margins, are transferred to the base station 12 in a descending order of sequence number. Therefore, it is possible to avoid loss of data and a communication interruption. In general, the transmission rate of the radio interface and the transmission rate of the inter-BTS interface are not always constant. The fluctuations in the difference between these transmission rates can be automatically absorbed by transmitting the unsent packets to the gateway 15 in an ascending order of sequence number and to the target base station 12 in a descending order of sequence number. It is possible to have all the unsent packets arrive at the gateway 15 without losing any packet.

10.2) Seventh Embodiment

Referring to FIG. 12C, according to the seventh embodiment of the present invention, for unsent data packets D(N) to D(N+7) including incompletely received packets, the packets corresponding to the incompletely received packets are retransmitted from the mobile station 14 through the radio interface, in an ascending order of sequence number starting from the packet assigned the smallest sequence number among the unsent data packets D(N) to D(N+7) (in the direction of an arrow 901). When the received packets become all complete, they are transmitted to the gateway 15. On the other hand, the unsent data packets including the incompletely received packets are transferred to the base station 12 in a descending order of sequence number starting from the packet assigned the largest sequence number among the unsent data packets D(N) to D(N+7) (in the direction of an arrow 902).

However, in the case where some of the unsent packets remain even if the HO activation time AT approaches expiration, the order of transferring packets to the base station 12 is changed to an ascending order of sequence number starting from the packet assigned the smallest sequence number among the remaining unsent packets (the direction of an arrow 903). In the example shown in FIG. 12C, if the packet D(N), which resulted in the incompletely received packet D*(N) for the first time, has been retransmitted from the mobile station 14 and the packets D(N) to D(N+2) have been transmitted to the gateway 15, then the packet D*(N+3) and the subsequent packets, namely, the packets D*(N+3), D(N+4) and D(N+5) are transferred to base station 12 through the inter-BTS interface XUB.

When the transmission rate of the radio interface between the base station 11 and the mobile station 14 has dropped by more than expected, there are some cases where unsent packets remain even if the HO activation time AT approaches expiration. In this case, it is desirable to reduce the duration of a communication interruption by dealing with an incompletely received packet assigned a smaller sequence number sooner. Therefore, according to the seventh embodiment, when the HO activation time AT approaches expiration, the order of transferring packets to the base station 12 is changed to an ascending order of sequence number (the direction of the arrow 903), in which thereafter the packets are transferred to the base station 12.

10.3) Eighth Embodiment

Referring to FIG. 12D, according to the eighth embodiment of the present invention, for unsent data packets D(N) to D(N+7) including incompletely received packets, the packets corresponding the incompletely received packets are retransmitted from the mobile station 14 through the radio interface in an ascending order of sequence number starting from the packet assigned the smallest sequence number among the unsent data packets D(N) to D(N+7) (in the direction of an arrow 901). When the received packets become all complete, they are transmitted to the gateway 15. On the other hand, the transfer to the base station 12 is carried out in an ascending order of sequence number starting from the packet at a calculated transfer start point TSP (in the direction of an arrow 904).

The transfer start point TSP can be determined as follows. The transmission rate $R_{AIR}$ of the radio interface between the base station 11 and the mobile station 14 and the transmission rate $R_{XUB}$ of the interface XUB between the base stations 11 and 12 are monitored, and the transfer start point TSP is calculated based on these transmission rates $R_{AIR}$ and $R_{XUB}$ and the total quantity B of the unsent packets to transmit. In FIG. 12D, the transfer start point TSP is the packet D(N+6). A method for calculating the transfer start point TSP will be described later.

When the transmission rate $R_{AIR}$ of the radio interface and the transmission rate $R_{XUB}$ of the inter-BTS interface XUB have both dropped in particular, it is desirable to transmit a packet assigned a smaller sequence number to the gateway 15 earlier, in order to avoid a communication interruption. According to the eighth embodiment, the transmission to the gateway 15 and the transfer to the base station 12 are each carried out in an ascending order of the sequence numbers of the unsent packets. Accordingly, a packet assigned a smaller sequence number is transmitted to the gateway 15 earlier, and consequently, the duration of a communication interruption can be reduced. In addition, since the packets are transmitted in an ascending order of sequence number, the control performed on the receiving side can be simplified.

10.4) Ninth Embodiment

Referring to FIG. 12E, according to the ninth embodiment of the present invention, for unsent data packets D(N) to D(N+7) including incompletely received packets, the packets corresponding the incompletely received packets are retransmitted from the mobile station 14 through the radio interface in an ascending order of sequence number, starting from the packet assigned the smallest sequence number among the unsent data packets D(N) to D(N+7) (in the direction of an arrow 901). When the received packets become all complete, they are transmitted to the gateway 15. On the other hand, the transfer to the base station 12 is carried out in an ascending order of sequence number starting from the packet at a calculated transfer start point TSP (in the direction of an arrow 904). Note that the transfer start point TSP is similar to that of the eighth embodiment.

However, in the case where some of the unsent packets remain even if the HO activation time AT approaches expiration, the order of transferring packets to the base station 12 is changed to an ascending order of sequence number starting from the packet assigned the smallest sequence number among the remaining unset packets (the direction of an arrow 905). In the example shown in FIG. 12E, if the packet D(N), which resulted in the incompletely received packet D*(N) for the first time, has been retransmitted from the mobile station 14 and the data packets D(N) and D(N+1) have been transmitted to the gateway 15, then the packet D(N+2) and the subsequent packets, namely, the packets D(N+2), D*(N+3), D(N+4), and D(N+5) are transferred to the base station 12 through the inter-BTS interface XUB.

When the transmission rate of the radio interface between the base station 11 and the mobile station 14 has dropped by more than expected, there are some cases where the packet transmission has not progressed as much up to the transfer start point TSP as calculated, with the result that unsent packets remain even if the HO activation time AT approaches expiration. In this case, it is desirable to reduce the duration of a communication interruption by dealing with an incompletely received packet assigned a smaller sequence number sooner. Therefore, according to the ninth embodiment, when the HO activation time AT approaches expiration, the order of transferring packets to the base station 12 is changed to an ascending order of sequence number (the direction of the arrow 905), in which thereafter the packets are transferred to the base station 12.

10.5) Modified Examples

For a modified example of the seventh embodiment, in the case where unsent packets remain even if the HO activation time AT approaches expiration, the transfer of the remaining unsent packets to the base station 12 may also be started from the packet at a calculated transfer start point TSP, in an ascending order of sequence number (the direction of the arrow 903). The transfer start point TSP is similar to that of the eighth embodiment.

For a modified example of the ninth embodiment, in the case where unsent packets remain even if the HO activation time AT approaches expiration, the order of transferring packets to the base station 12 can also be changed to a descending order of sequence number starting from the packet immediately before the transfer start point TSP (in the reverse direction to the arrow 905).

In the sixth to ninth embodiments, the completely received packets, as well as the incompletely received packets, are also stored until the received packets become all complete in sequence order at the serving base station 11. However, the present invention is not limited to this. For a modified example of any of the sixth to ninth embodiments, the present invention can also apply in the case where, if completely received packets are among the packets received for the first time from the mobile station 14, these completely received packets are first sequentially transmitted to the gateway 15 even not in sequence order, and the incompletely received packets are made complete by retransmission and then transmitted to the gateway 15. In this case, the gateway 15 rearranges a series of the packets received from the base stations 11 and 12 in sequence order.

11. Sixth Embodiment

FIG. 13 is a sequence diagram showing procedures for handover and uplink data transmission according to the sixth embodiment of the present invention. The mobile station 14 transmits data packets D(N) to D(N+7) to the current serving base station 11 (S1000). In this embodiment, the serving base station 11 cannot completely receive all the packets and it is assumed hereinafter that the data packets D*(N), D*(N+3), D*(N+6), and D*(N+7) are incompletely (or partially) received packets. In this case, the control section 303 of the base station 11 sends a reception status report to the mobile station 14 (S1001) and stores these data packets D*(N), D(N+1), D(N+2), D*(N+3), D(N+4), D(N+5), D*(N+6), and D*(N+7) (hereinafter, simply referred to as unsent data packets D(N) to D(N+7)) in the buffer section 301 until the incompletely received packets are made complete by the corresponding packets being sequentially retransmitted from the mobile station 14.

At this point in time, it is assumed that the mobile station 14 detects that the strength of a radio signal received from the serving base station 11 becomes lower and evaluates the necessity of a handover (S1002). The mobile station 14 that has evaluated a handover searches for a new connectable base station and, as a result of the search, makes a HO request to the base station 11, for new connection to the base station 12 (S1003).

When the mobile station 14 sends the HO request to the serving base station 11, the respective HO controllers 304 of the base station 11 and the target base station 12 make mutual handover adjustment for the mobile station 14 to decide a handover (S1004).

When the handover is decided, the HO controller 304 of the base station 11 sends the mobile station 14 a HO command in which a HO activation time AT is set (S1005). At this point in time, the timer for the HO activation time AT is started in each of the mobile station 14 and the base station 11 (S1006). Note that the HO activation time AT is not only determined through calculation as described earlier but may be set at a predetermined fixed value.

When the timer for the HO activation time AT has been started, the divide controller 305 of the base station 11 controls the buffer management table 302 and starts transferring the unsent data packets to the base station 12 through the inter-BTS interface XUB, in a descending order of sequence number starting from the packet assigned the largest sequence number among the unsent data packets D(N) to D(N+7) (S1007, S1010).

In parallel with this, the mobile station 14 retransmits the packets corresponding to the unsent data packets D*(N), D*(N+3), D*(N+6), and D*(N+7), which are determined that they have been incompletely received, to the base station 11 through the radio interface, in an ascending order of sequence number starting from the packet assigned the smallest sequence number among these packets (S1008, S1011). Thus, when the base station 11 first receives the packet D(N) completely (S1008), the divide controller 305 of the base station 11 controls the buffer management table 302 and transmits the completely received packets D(N) to D(N+2) to the gateway 15 (S1009). Next, when the base station 11 receives the packet D(N+3) completely (S1011), the divide controller 305 of the base station 11 controls the buffer management table 302 and transmits the completely received packets D(N+3) to D(N+5) to the gateway 15 (S1012).

When the timer for the HO activation time AT has expired, the mobile station 14 establishes physical-layer synchronization with the target base station 12 (S1013). When the synchronization with the base station 12 is established, the mobile station 14 retransmits the packets corresponding to the remaining incompletely received packets D*(N+6) and D*(N+7) to the new serving base station 12 through the radio interface, in an ascending order of sequence number starting from the packet assigned the smallest sequence number of these packets (S1014). When the base station 12 receives the unsent data packets D(N+6) and D(N+7) completely, the control section 303 of the base station 12 transmits these packets to the gateway 15 (S1015). In addition, the gateway 15 updates the serving base station of the mobile station 14 from the base station 11 to the base station 12, based on notifications from the base stations 11 and 12 (S1016). Thereafter, a packet D(N+8) from the mobile station 14 is transmitted to the base station 12 (S1017). If received completely, the packet D(N+8) is transmitted to the gateway 15.

As described above, two transmission routes are used to transmit the unsent data packets: a direct route from the base station 11 to the gateway 15, and a route from the base station 11, via the base station 12, to the gateway 15. Thereby, the data packets unsent at the time of handover can be transmitted to the gateway 15 at high speed. Further, since the quantity of the packets transferred through the interface XUB at the time of handover can be reduced, high-speed data transfer is possible even when a large number of handovers are processed at a time. Accordingly, it is possible to achieve a reduction in the duration of a communication interruption, and enhanced quality of communication.

12. Seventh Embodiment

Figure 14:
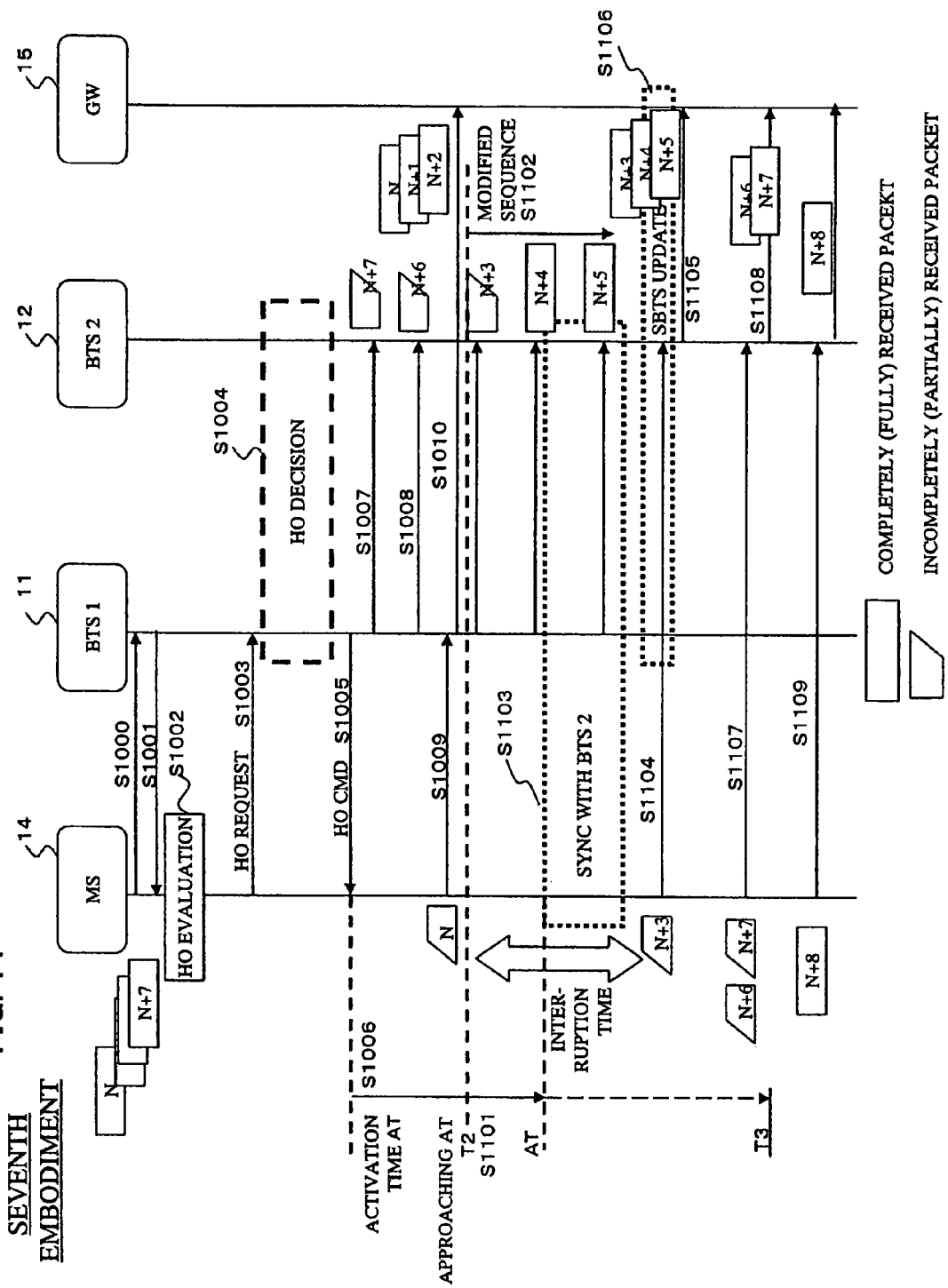
FIG. 14 is a sequence diagram showing procedures for handover and uplink data transmission according the seventh embodiment of the present invention.

FIG. 14 is a sequence diagram showing procedures for handover and uplink data transmission according the seventh embodiment of the present invention. Here, the mobile station 14 transmits data packets D(N) to D(N+7) to the current serving base station 11 (S1000). In this embodiment, the serving base station 11 cannot completely receive all the packets and it is assumed hereinafter that the data packets D*(N), D*(N+3), D*(N+6), and D*(N+7) are incompletely received packets. In this case, the control section 303 of the base station 11 sends a reception status report to the mobile station 14 (S1001) and stores these data packets D*(N), D(N+1), D(N+2), D*(N+3), D(N+4), D(N+5), D*(N+6), and D*(N+7) (hereinafter, simply referred to as unsent data packets D(N) to D(N+7)) in the buffer section 301 until the incompletely received packets are made complete by the corresponding packets being sequentially retransmitted from the mobile station 14.

At this point in time, it is assumed that the mobile station 14 detects that the strength of a radio signal received from the serving base station 11 becomes weaker and evaluates the necessity of a handover (S1002). The mobile station 14 that has evaluated a handover searches for a new connectable base station and, as a result of the search, makes a HO request to the base station 11, for new connection to the base station 12 (S1003).

When the mobile station 14 sends the HO request to the serving base station 11, the respective HO controllers 304 of the base station 11 and the target base station 12 make mutual handover adjustment for the mobile station 14 and decide a handover (S1004).

When the handover is decided, the HO controller 304 of the base station 11 sends the mobile station 14 a HO command in which a HO activation time AT is set (S1005). At this point in time, the timer for the HO activation time AT is started in each of the mobile station 14 and the base station 11 (S1006). Note that the HO activation time AT is not only determined through calculation as described earlier but may be set at a predetermined fixed value.

When the timer for the HO activation time AT is started, the divide controller 305 of the base station 11 controls the buffer management table 302 and starts transferring the unsent data packets to the base station 12 through the inter-BTS interface XUB, in a descending order of sequence number starting from the packet assigned the largest sequence number among the unsent data packets D(N) to D(N+7). Here, the unsent data packet D*(N+7) is first transferred (S1007), and subsequently the unsent data packet D*(N+6) is transferred (S1008).

In parallel with this, the mobile station 14 retransmits the packets corresponding to the unsent data packets D*(N), D*(N+3), D*(N+6), and D*(N+7), which are determined that they have been incompletely received, to the base station 11 through the radio interface, in an ascending order of sequence number starting from the packet assigned the smallest sequence number among these packets (S1009).

Thus, when the base station 11 receives the packet D(N) completely (S1009), the divide controller 305 of the base station 11 controls the buffer management table 302 and transmits the completely received packets D(N) to D(N+2) to the gateway 15 (S1010). Since the unsent packet D*(N+3) is not received completely at this point in time, the unsent packets D(N) to D(N+2) are transmitted to the gateway 15.

The divide controller 305 of the base station 11 checks whether or not the HO activation time AT approaches expiration, based on the difference between the current time and the expiration point of the HO activation time AT, and also checks the quantity of unsent data packets remaining in the buffer section 301 at this point in time (S1101). For a reference to determine whether or not the HO activation time AT approaches expiration, a time point T2 can be used which is a predetermined period of time before the HO activation time AT expires, for example.

In the case where a predetermined quantity or more of the unsent data packets remain even if it is the time point T2 where the HO activation time AT approaches expiration (S1101), the divide controller 305 of the base station 11 controls the buffer management table 302 and changes the order of transferring packets to the base station 12 to an ascending order of sequence number starting from the packet assigned the smallest sequence number among the remaining unsent data packets (S1102). Here, since the unsent data packets D(N) to D(N+2) have been transmitted to the gateway 15 already, the base station 11 sequentially transfers the remaining unsent data packets D*(N+3), D(N+4) and D(N+5) to the base station 12 after the time point T2.

When the timer for the HO activation time AT has expired, the mobile station 14 establishes physical-layer synchronization with the target base station 12 (S1103). When the synchronization with the base station 12 is established, the mobile station 14 retransmits the packets corresponding to the remaining incompletely received packets D*(N+3), D*(N+6) and D*(N+7) to the new serving base station 12 through the radio interface, in an ascending order of sequence number starting from the packet assigned the smallest sequence number among these packets. When the packet corresponding to the incompletely received packet D*(N+3) is retransmitted to the base station 12 (S1104), the control section 303 of the base station 12 transmits the unsent packets D(N+3) to D(N+5) to the gateway 15 (S1105). Similarly, when the packets corresponding to the incompletely received packets D*(N+6) and D*(N+7) are retransmitted to the base station 12 (S1107), the control section 303 of the base station 12 transmits the unsent packets D(N+6) and D(N+7) to the gateway 15 (S1108). In addition, the gateway 15 updates the serving base station of the mobile station 14 from the base station 11 to the base station 12, based on notifications from the base stations 11 and 12 (S1106). Thereafter, a packet D(N+8) from the mobile station 14 is transmitted to the base station 12 (S1109). If received completely, the packet D(N+8) is transmitted to the gateway 15.

As described above, according to the seventh embodiment, when the HO activation time AT approaches expiration, the order of transferring packets to the base station 12 is changed to an ascending order of sequence number, in which thereafter the packets are transferred to the base station 12. Thereby, an incompletely received packet assigned a smaller sequence number is processed sooner. Consequently, the duration of a communication interruption can be reduced.

13. Eighth Embodiment

Figure 15:
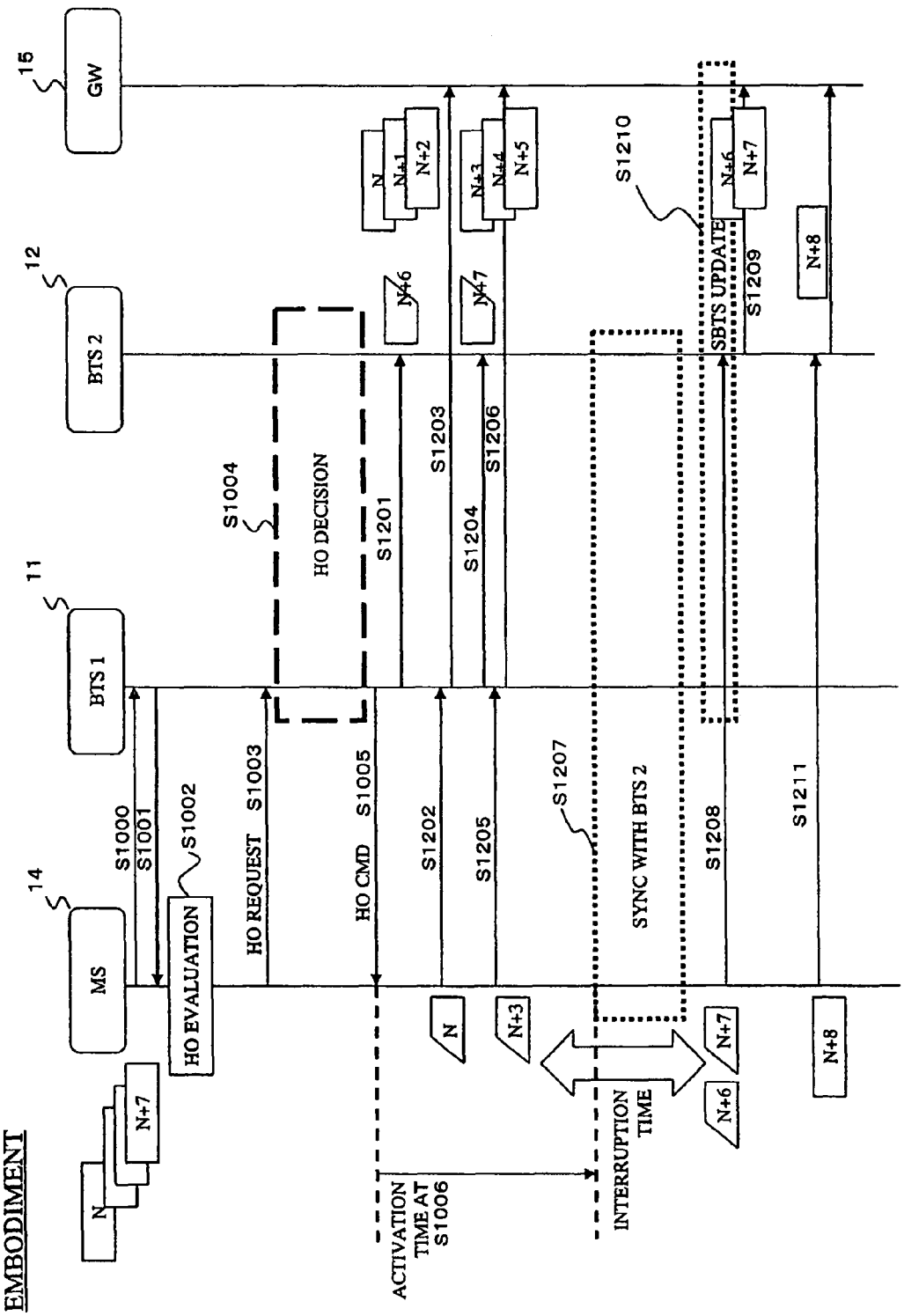
FIG. 15 is a sequence diagram showing procedures for handover and uplink data transmission according to the eighth embodiment of the present invention.

FIG. 15 is a sequence diagram showing procedures for handover and uplink data transmission according to the eighth embodiment of the present invention. The mobile station 14 transmits data packets D(N) to D(N+7) to the current serving base station 11 (S1000). In this embodiment, the serving base station 11 cannot completely receive all the packets and it is assumed hereinafter that the data packets D*(N), D*(N+3), D*(N+6), and D*(N+7) are incompletely received packets. In this case, the control section 303 of the base station 11 sends a reception status report to the mobile station 14 (S1001) and stores these data packets D*(N), D(N+1), D(N+2), D*(N+3), D(N+4), D(N+5), D*(N+6), and D*(N+7) (hereinafter, referred to as unsent data packets D(N) to D(N+7)) in the buffer section 301 until the incompletely received packets are made complete by the corresponding packets being sequentially retransmitted from the mobile station 14.

At this point in time, it is assumed that the mobile station 14 detects that the strength of a radio signal received from the current serving base station 11 becomes weaker and evaluates the necessity of a handover (S1002). The mobile station 14 that has evaluated a handover searches for a new connectable base station and, as a result of the search, makes a HO request to the base station 11, for new connection to the base station 12 (S1003).

When the mobile station 14 sends the HO request to the serving base station 11, the respective HO controllers 304 of the base station 11 and the target base station 12 make mutual adjustment for handover for the mobile station 14 and decides a handover (S1004).

When the handover is decided, the HO controller 304 of the base station 11 sends the mobile station 14 a HO command in which a HO activation time AT is set (S1005). At this point in time, the timer for the HO activation time AT is started in each of the mobile station 14 and the base station 11 (S1006). Note that the HO activation time AT is not only determined through calculation as described earlier but may be set at a predetermined fixed value.

When the timer for the HO activation time AT is started, the divide controller 305 of the base station 11 calculates a transfer start point TSP, which corresponds to the number of packets estimated to be successfully received completely from the mobile station 14 through the radio interface and then transmitted to the gateway 15, based on the transmission rate $R_{AIR}$ of the radio interface with the mobile station 14, the transmission rate $R_{XUB}$ of the interface XUB with the base station 12, and the total quantity B of the unsent data packets to transmit.

A method for calculating the transfer start point TSP is as follows. The transfer start point TSP corresponds to the number of packets estimated to be successfully transmitted to the gateway 15 through the interface XU between the base station 11 and the gateway 15. Since all the unsent packets should be sent off through the interfaces XUB and XU within a period of time, the transfer start point TSP can be calculated with consideration given to the retransmission from the mobile station 14 through the radio interface. The transfer start point TSP in this case is premised on a variable HO activation time AT. The unsent data packets should be all sent off through the interfaces XU and XUB by the expiration of the HO activation time AT.

However, if the HO activation time AT is fixed, the transfer start point TSP can be calculated as follows:

$$TSP = f_{NEXTGAP}(q * R_{AIR} * AT)$$

where q is a constant representing a margin; $R_{AIR}$ is the expected uplink transmission rate of the radio interface; $f_{NEXTGAP}(X)$ is a function of x, which returns the sequence number of the first one of the packets that cannot be transmitted to the gateway 15 when x (the data quantity of the data packets received from the mobile station 14) is given.

When the transfer start point TSP is determined (here, the number of packets estimated to be successfully transmitted=6), the divide controller 305 of the base station 11 controls the buffer management table 302 and starts transferring the unsent data packets to the base station 12 through the inter-BTS interface XUB, in an ascending order of sequence number starting from the packet assigned the smallest sequence number among the unsent data packets at and after the transfer start point TSP (here, D*(N+6) and D*(N+7)) (S1201, S1204).

In parallel with this, the mobile station 14 retransmits the packets corresponding to the unsent data packets D*(N), D*(N+3), D*(N+6), and D*(N+7), which are determined that they have been incompletely received, to the base station 11 through the radio interface, in an ascending order of sequence number starting from the packet assigned the smallest sequence number among these packets (S1202, S1205). Thus, when the base station 11 first receives the packet D(N) completely (S1202), the divide controller 305 of the base station 11 controls the buffer management table 302 and transmits the completely received packets D(N) to D(N+2) to the gateway 15 (S1203). Next, when the base station 11 receives the packet D(N+3) completely (S1205), the divide controller 305 of the base station 11 controls the buffer management table 302 and transmits the completely received packets D(N+3) to D(N+5) to the gateway 15 (S1206).

When the timer for the HO activation time AT has expired, the mobile station 14 establishes physical-layer synchronization with the target base station 12 (S1207). When the synchronization with the base station 12 is established, the mobile station 14 retransmits the packets corresponding to the remaining incompletely received packets D*(N+6) and D*(N+7) to the new serving base station 12 through the radio interface, in an ascending order of sequence number starting from the packet assigned the smallest sequence number of these packets (S1208). When receiving the unsent data packets D(N+6) and D(N+7) completely, the control section 303 of the base station 12 transmits these packets to the gateway 15 (S1209) In addition, the gateway 15 updates the serving base station of the mobile station 14 from the base station 11 to the base station 12, based on notifications from the base stations 11 and 12 (S1210). Thereafter, a packet D(N+8) from the mobile station 14 is transmitted to the base station 12 (S1211). If received completely, the packet D(N+8) is transmitted to the gateway 15.

As described above, according to the eighth embodiment, the transfer start point TSP is estimated, and the transmission to the gateway 15 and the transfer to the base station 12 are each performed in an ascending order of the sequence numbers of the unsent data packets, whereby a packet assigned a smaller sequence number is transmitted to the gateway 15 earlier. Consequently, the duration of a communication interruption can be reduced. In addition, since the transmission to the gateway 15 and the transfer to the base station 12 are each carried out in an ascending order of sequence number, the control performed on the receiving side can be simplified.

14. Ninth Embodiment

Figure 16:
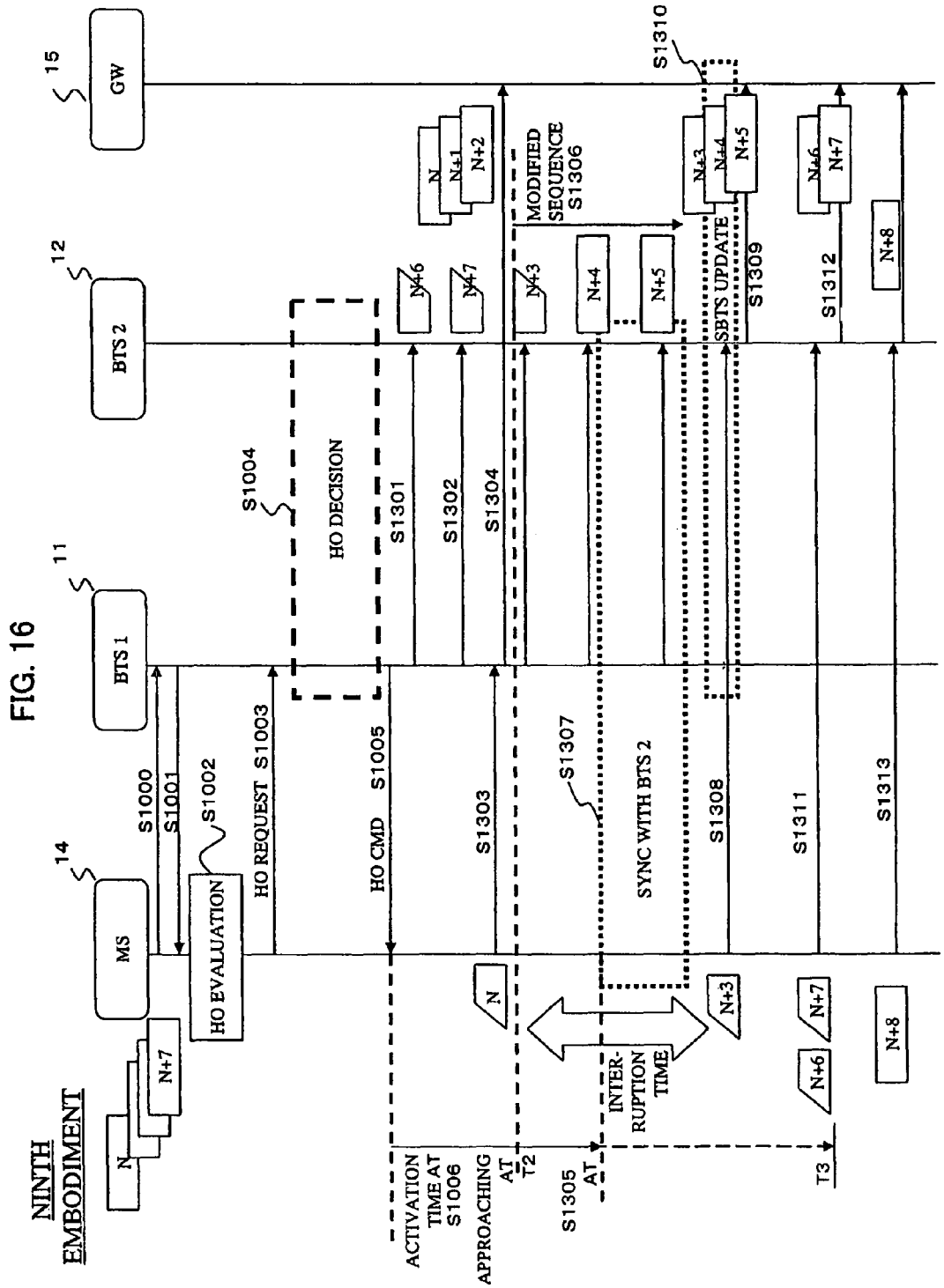
FIG. 16 is a sequence diagram showing procedures for handover and uplink data transmission according to the ninth embodiment of the present invention.

FIG. 16 is a sequence diagram showing procedures for handover and uplink data transmission according to the ninth embodiment of the present invention. The mobile station 14 transmits data packets D(N) to D(N+7) to the current serving base station 11 (S1000). In this embodiment, the serving base station 11 cannot completely receive all the packets and it is assumed hereinafter that the data packets D*(N), D*(N+3), D*(N+6), and D*(N+7) are incompletely received packets. In this case, the control section 303 of the base station 11 sends a reception status report to the mobile station 14 (S1001) and stores these data packets D*(N), D(N+1), D(N+2), D*(N+3), D(N+4), D(N+5), D*(N+6), and D*(N+7) (hereinafter, referred to as unsent data packets D(N) to D(N+7)) in the buffer section 301 until the incompletely received packets are made complete by the corresponding packets being sequentially retransmitted from the mobile station 14.

At this point in time, it is assumed that the mobile station 14 detects that the strength of a radio signal received from the current serving base station 11 becomes weaker and evaluates the necessity of a handover (S1002). The mobile station 14 that has evaluated a handover searches for a new connectable base station and, as a result of the search, makes a HO request to the base station 11, for new connection to the base station 12 (S1003).

When the mobile station 14 sends the HO request to the serving base station 11, the respective HO controllers 304 of the base station 11 and the target base station 12 make mutual adjustment for handover for the mobile station 14 and decide a handover (S1004).

When the handover is decided, the HO controller 304 of the base station 11 sends the mobile station 14 a HO command in which a HO activation time AT is set (S1005). At this point in time, the timer for the HO activation time AT is started in each of the mobile station 14 and the base station 11 (S1006). Note that the HO activation time AT is not only determined through calculation as described earlier but may be set at a predetermined fixed value.

When the timer for the HO activation time AT is started, the divide controller 305 of the base station 11 calculates a transfer start point TSP, which corresponds to the number of packets estimated to be successfully received completely from the mobile station 14 through the radio interface and then transmitted to the gateway 15, based on the transmission rate $R_{AIR}$ of the radio interface with the mobile station 14, the transmission rate $R_{XUB}$ of the interface XUB with the base station 12, and the total quantity B of the unsent data packets to transmit. A method for calculating the transfer start point TSP is as described already.

When the transfer start point TSP is determined (here, the number of packets estimated to be successfully transmitted=6), the divide controller 305 of the base station 11 controls the buffer management table 302 and starts transferring the unsent data packets to the base station 12 through the inter-BTS interface XUB, in an ascending order of sequence number starting from the packet assigned the smallest sequence number among the unsent data packets at and after the transfer start point TSP (here, D*(N+6) and D*(N+7)) (S1301, S1302).

In parallel with this, the mobile station 14 retransmits the packets corresponding to the unsent data packets D*(N), D*(N+3), D*(N+6), and D*(N+7), which are determined that they have been incompletely received, to the base station 11 through the radio interface, in an ascending order of sequence number starting from the packet assigned the smallest sequence number among these packets (S1303). Thus, when the base station 11 receives the packet D(N) completely (S1303), the divide controller 305 of the base station 11 controls the buffer management table 302 and transmits the completely received packets D(N) to D(N+2) to the gateway 15 (S1304).

Moreover, the divide controller 305 of the base station 11 checks whether or not the HO activation time AT approaches expiration, based on the difference between the current time and the expiration point of HO activation time AT, and also checks the quantity of unsent data packets remaining in the buffer section 301 at this point in time. For a reference to determine whether or not the HO activation time AT approaches expiration, a time point T2 can be used which is a predetermined period of time before the HO activation time AT expires, for example.

In the case where a predetermined quantity or more of unsent data packets remain even if it is the time point T2 where the HO activation time AT approaches expiration (S1305), the divide controller 305 of the base station 11 controls the buffer management table 302 and changes the order of transferring packets to the base station 12 to an ascending order of sequence number starting from the packet assigned the smallest sequence number among the remaining unsent data packets (S1306). Here, since the unsent data packets D(N) to D(N+2) have been transmitted to the gateway 15 already, the base station 11 sequentially transfers the remaining unsent data packets D*(N+3), D(N+4) and D(N+5) to the base station 12 after the time point T2.

When the timer for the HO activation time AT has expired, the mobile station 14 establishes physical-layer synchronization with the target base station 12 (S1307). When the synchronization with the base station 12 is established, the mobile station 14 retransmits the packets corresponding to the remaining incompletely received packets D*(N+3), D*(N+6) and D*(N+7) to the new serving base station 12 through the radio interface, in an ascending order of sequence number starting from the packet assigned the smallest sequence number among these packets. When the packet corresponding to the incompletely received packet D*(N+3) is retransmitted to the base station 12 (S1308), the control section 303 of the base station 12 transmits the unsent data packets D(N+3) to D(N+5) to the gateway 15 (S1309). Similarly, when the packets corresponding to the incompletely received packet D*(N+6) and D*(N+7) are retransmitted to the base station 12 (S1311), the control section 303 of the base station 12 transmits the unsent data packets D(N+6) and D(N+7) to the gateway 15 (S1312). In addition, the gateway 15 updates the serving base station of the mobile station 14 from the base station 11 to the base station 12, based on notifications from the base stations 11 and 12 (S1310). Thereafter, a packet D(N+8) from the mobile station 14 is transmitted to the base station 12 (S1313). If received completely, the packet D(N+8) is transmitted to the gateway 15.

As described above, according to the ninth embodiment, the transfer start point TSP is estimated, and the transmission to the gateway 15 and the transfer to the base station 12 are each performed in an ascending order of the sequence numbers of the unsent data packets, whereby a packet assigned a smaller sequence number is transmitted to the gateway 15 earlier. Consequently, the duration of a communication interruption can be reduced. In addition, when the HO activation time AT approaches expiration, the order of transferring packets to the base station 12 is changed to an ascending order of sequence number, in which thereafter the packets are transferred to the base station 12. Thereby, an incompletely received packet assigned a smaller sequence number is processed sooner. Accordingly, the duration of a communication interruption can be reduced.

15. Modified Examples

According to the sixth to ninth embodiments, the completely received packets, as well as the incompletely received packets, are also stored as unsent packets until the received packets become all complete in sequence order at the serving base station 11. However, the present invention is not limited to this. The present invention can also apply in the case where, if completely received packets are among the packets received for the first time from the mobile station 14, these completely received packets are first sequentially transmitted to the gateway 15 even not in sequence order, and the incompletely received packets are made complete by retransmission and then transmitted to the gateway 15. In this case, the gateway 15 rearranges a series of the packets received from the base stations 11 and 12 in sequence order. Hereinafter, this procedure will be described as a modified example of the sixth embodiment shown in FIG. 13. This procedure is also applicable as a similar modified example of any of the seventh to ninth embodiments.

Figure 17:
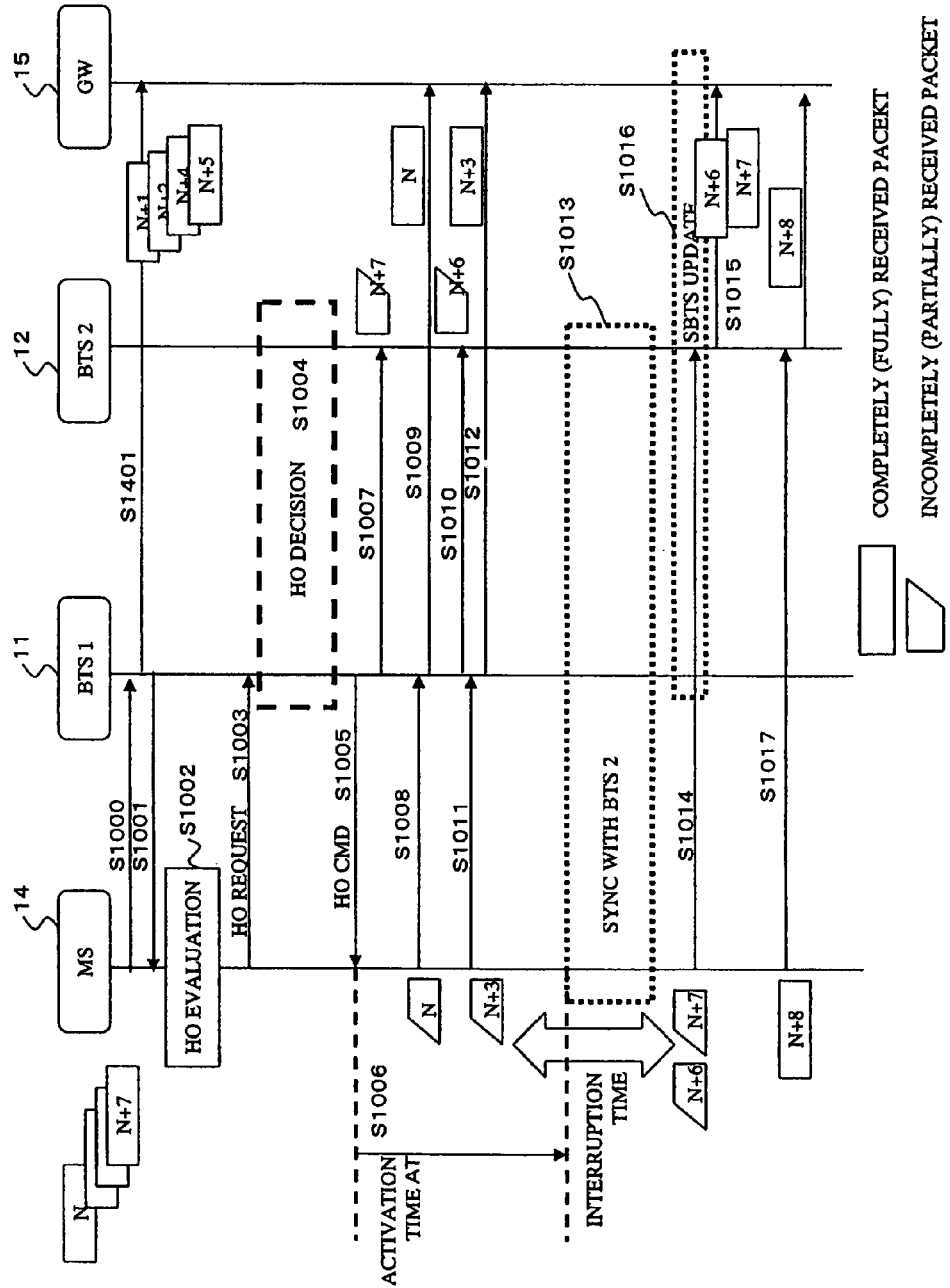
FIG. 17 is a sequence diagram showing procedures for handover and uplink data transmission according to a modified example of the sixth embodiment of the present invention.

FIG. 17 is a sequence diagram showing procedures for handover and uplink data transmission according to a modified example of the sixth embodiment of the present invention. First, the mobile station 14 transmits data packets D(N) to D(N+7) to the current serving base station 11 (S1000). In this example, the serving base station 11 cannot completely receive all the packets and it is assumed hereinafter that the data packets D*(N), D*(N+3), D*(N+6), and D*(N+7) are incompletely received packets. In this case, the control section 303 of the base station 11 sends a reception status report to the mobile station 14 (S1001) and transmits the completely received packets D(N+1), D(N+2), D(N+4), and D(N+5) to the gateway 15 while waiting for the packets corresponding to the incompletely received packets to be sequentially retransmitted from the base station 14 (S1401). Therefore, the incompletely received packets D*(N), D*(N+3), D*(N+6), and D*(N+7) are stored in the buffer section 301. In this modified example, these incompletely received packets D*(N), D*(N+3), D*(N+6), and D*(N+7) stored in the buffer section 301 will be referred to as unsent data packets.

At this point in time, it is assumed that the mobile station 14 detects that the strength of a radio signal received from the serving base station 11 becomes weaker and evaluates the necessity of a handover (S1002). The mobile station 14 that has evaluated a handover searches for a new connectable base station and, as a result of the search, makes a HO request to the base station 11, for new connection to the base station 12 (S1003).

When the mobile station 14 sends the HO request to the serving base station 11, the respective HO controllers 304 of the base station 11 and the target base station 12 make mutual adjustment for handover for the mobile station 14 and decide a handover (S1004).

When the handover is decided, the HO controller 304 of the base station 11 sends the mobile station 14 a HO command in which a HO activation time AT is set (S1005). At this point in time, the timer for the HO activation time AT is started in each of the mobile station 14 and the base station 11 (S1006). Note that the HO activation time AT is not only determined through calculation as described earlier but may be set at a predetermined fixed value.

When the timer for the HO activation time AT is started, the divide controller 305 of the base station 11 controls the buffer management table 302 and starts transferring the unsent data packets D*(N), D*(N+3), D*(N+6), and D*(N+7) to the base station 12 through the inter-BTS interface XUB, in a descending order of sequence number starting from the packet assigned the largest sequence number among these packets (S1007, S1010).

In parallel with this, the mobile station 14 retransmits the packets corresponding to the unsent data packets D*(N), D*(N+3), D*(N+6), and D*(N+7), which are determined that they have been incompletely received, to the base station 11 through the radio interface, in an ascending order of sequence number starting from the packet assigned the smallest sequence number among these packets (S1008, S1011). Thus, when the base station 11 first receives the packet D(N) completely (S1008), the divide controller 305 of the base station 11 controls the buffer management table 302 and transmits the completely received packet D(N) to the gateway 15 (S1009). Next, when the base station 11 receives the packet D(N+3) completely (S1011), the divide controller 305 of the base station 11 controls the buffer management table 302 and transmits the completely received packets D(N+3) to the gateway 15 (S1012). Since the completely received packets D(N+1), D(N+2), D(N+4), and D(N+5) have been transmitted to the gateway 15 already (S1401), the gateway 15 has the uplink packets D(N) to D(N+5) in a complete form at this point in time.

When the timer for the HO activation time AT has expired, the mobile station 14 establishes physical-layer synchronization with the target base station 12 (S1013). When the synchronization with the base station 12 is established, the mobile station 14 retransmits the packets corresponding to the remaining incompletely received packets D*(N+6) and D*(N+7) to the new serving base station 12 through the radio interface, in an ascending order of sequence number starting from the packet assigned the smallest sequence number of these packets (S1014). When the base station 12 receives the unsent data packets D(N+6) and D(N+7) completely, the control section 303 of the base station 12 transmits these packets to the gateway 15 (S1015). In addition, the gateway 15 updates the serving base station of the mobile station 14 from the base station 11 to the base station 12, based on notifications from the base stations 11 and 12 (S1016). Thereafter, a packet D(N+8) from the mobile station 14 is transmitted to the base station 12 (S1017). If received completely, the packet D(N+8) is transmitted to the gateway 15.

As described above, the serving base station 11 transmits the packets completely received from the mobile station 14 to gateway 15 and transfers some of the incompletely received packets, remaining at the base station 11, to the handover-target base station 12. Therefore, two transmission routes are used to transmit the unsent data packets: a direct route from the base station 11 to the gateway 15, and a route from the base station 11, via the base station 12, and to the gateway 15. Thereby, the data packets unsent at the time of handover can be transmitted to the gateway 15 at high speed. The quantity of the packets transferred through the interface XUB at the time of handover particularly can be greatly reduced because the completely received packets are transmitted from the serving base station 11 to the gateway 15 before the handover. Therefore, high-speed data transfer is possible even when a large number of handovers are processed at a time. Accordingly, it is possible to achieve a reduction in the duration of a communication interruption, and enhanced quality of communication.

16. Mobile Station

Figure 18:
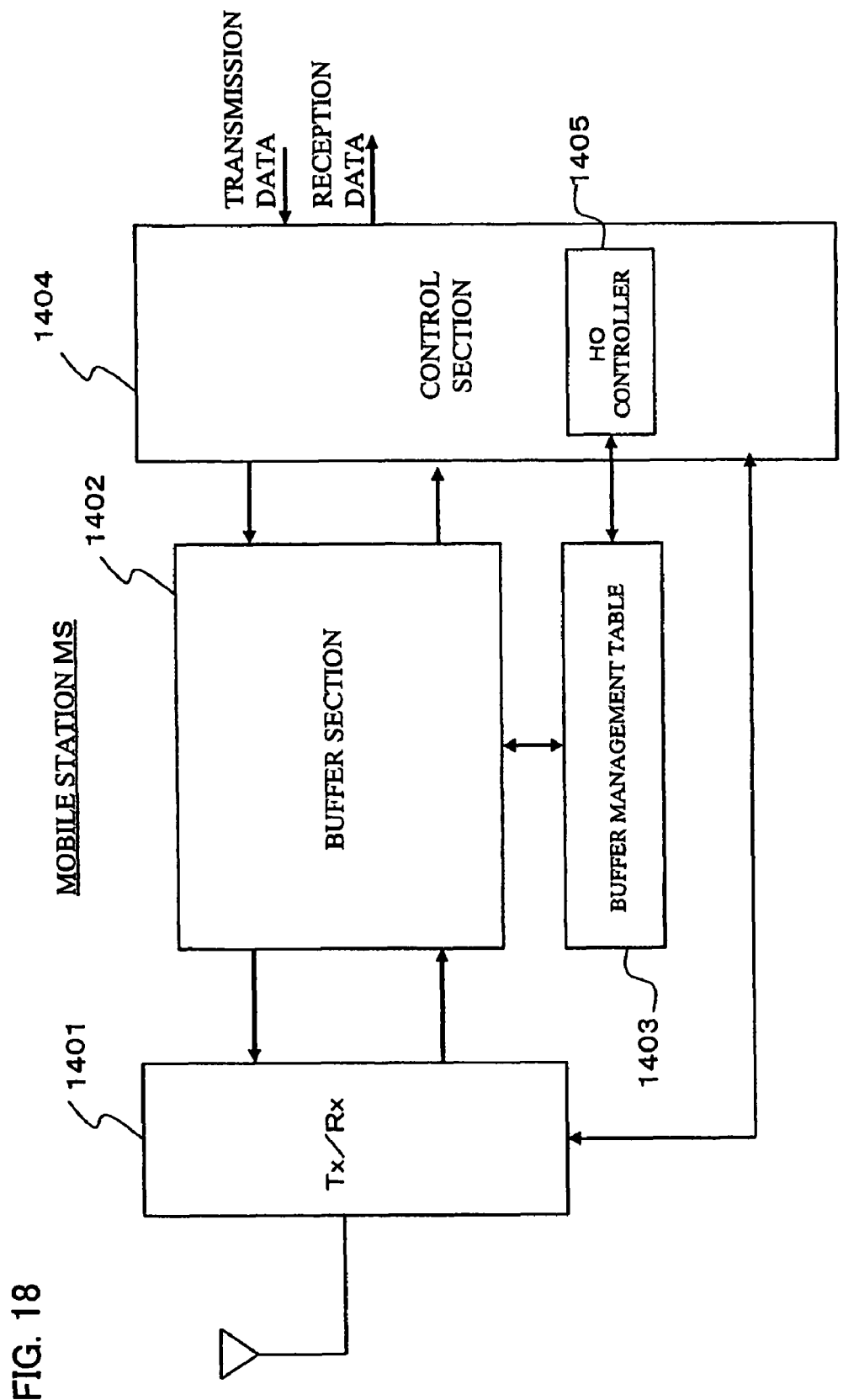
FIG. 18 is a block diagram showing an example of a mobile station in a mobile communications system according to the present invention.

FIG. 18 is a block diagram showing an example of a mobile station in a mobile communications system according to the present invention. Here, only the parts related to the present invention are shown.

The mobile station has a radio transceiver 1401 for communicating with a base station through a radio interface. Transmission data and reception data are stored in a buffer section 1402, which is controlled by a control section 1404 using a management table 1403. The control section 1404 functionally includes a HO controller 1405 and executes the transmission/reception operations, HO evaluation, execution of a HO command, management of the timer for the HO activation time AT, control of the synchronization establishment with a new base station, and the like according to any one of the above-described embodiments.

For example, in the reception of packets in the first mode shown in FIG. 4A, the mobile station 14 receives the packets D(N) to D(N+3) from the base station 11 and, after the handover, receives the packets D(N+4) to D(N+7) from the new serving base station 12. Therefore, before and after the handover, the mobile station 14 needs to store these received packets in the buffer section 1402.

Additionally, in the second mode shown in FIG. 4B, when the mobile station 14 has received a reception status report from the base station 11, the control section 1404 retransmits to the base station 11 the packets reported to have been incompletely received. After the handover, the control section 1404 retransmits to the base station 12 the packets excluding those already retransmitted. That is, the mobile station 14 retransmits the packets corresponding to the incompletely received packets to the different base stations before and after the handover.

Note that the mobile station is a portable device having a communication function and an information processing function, such as a mobile telephone and a mobile information terminal, for example.

The present invention can be applied to general mobile communications systems having an inter-BTS interface.

The invention claimed is:

1. A method for transmitting data in a mobile communications system, comprising:
    at a mobile station,
        when a base station is transmitting data to the mobile station, notifying the base station of a switch request that a connection of the mobile station switches from the base station to another base station;
    at the base station,
        when it is determined that the connection of the mobile station switches to the other base station, transmitting one part of unsent data destined for the mobile station to the mobile station and the other part of unsent data to the other base station, the one part of the unsent data starting from a smallest sequence number in ascending order of a sequence of the unsent data, and the other part of the unsent data starting from a largest sequence number in descending order of the sequence of the unsent data; and
    at the other base station,
        when it becomes possible to transmit data to the mobile station, transmitting the other part of the unsent data to the mobile station.

2. A method for transmitting data in a mobile communications system, comprising:
    at a mobile station,
        when a base station is transmitting data to the mobile station, notifying the base station of a switch request that a connection of the mobile station switches from the base station to another base station;
    at the base station,
        when it is determined that the connection of the mobile station switches to the other base station, transmitting one part of unsent data destined for the mobile station to the mobile station and the other part of unsent data to the other base station, the one part of the unsent data starting from a smallest sequence number in ascending order of a sequence of the unsent data, and the other part of the unsent data starting from a sequence position which is larger in sequence number than a smallest sequence position; and
    at the other base station,
        when it becomes possible to transmit data to the mobile station, transmitting the other part of the unsent data to the mobile station,
    wherein the base station determines the sequence position based on a first transmission rate between the base station and the mobile station and a second transmission rate between the base station and the other base station.

3. The method according to claim 2, wherein the base station controls timing of switching the connection of the mobile station from the base station to the other base station.

4. The method according to claim 3, wherein if there is a remaining part of the unsent data when approaching the timing, the base station sequentially transmits the remaining part to the other base station starting from a smallest sequence number in ascending order of the remaining part.

5. The method according to claim 3, wherein the timing is determined based on a first transmission rate between the base station and the mobile station and a second transmission rate between the base station and the other base station.

6. The method according to claim 4, wherein the timing is determined based on a first transmission rate between the base station and the mobile station and a second transmission rate between the base station and the other base station.

7. The method according to claim 1, wherein the unsent data is downlink data transmitted from a gateway station to the mobile station.

8. A system for transmitting data in a mobile communications system including a plurality of base stations, wherein each of the plurality of base stations comprises:
   a reception section for receiving a switch request from a mobile station on data transmission to the mobile station, the switch request being that a connection of the mobile station switches from the base station to another base station; and
   a transmission controller controlling such that when it is determined that the connection of the mobile station switches to the other base station, one part of unsent data destined for the mobile station is transmitted to the mobile station and the other part of unsent data to the other base station, the one part of the unsent data starting from a smallest sequence number in ascending order of a sequence of the unsent data, and the other part of the unsent data starting from a largest sequence number in descending order of the sequence of the unsent data,
   wherein the other base station, when it becomes possible to transmit data to the mobile station, transmits the other part of the unsent data to the mobile station.

9. A base station for transmitting data to a mobile station in a mobile communications system, comprising:
   a reception section for receiving a switch request from a mobile station on data transmission to the mobile station, the switch request being that a connection of the mobile station switches from the base station to another base station; and
   a transmission controller controlling such that when it is determined that the connection of the mobile station switches to the other base station, one part of unsent data destined for the mobile station is transmitted to the mobile station and the other part of unsent data to the other base station, the one part of the unsent data starting from a smallest sequence number in ascending order of a sequence of the unsent data, and the other part of the unsent data starting from a largest sequence number in descending order of the sequence of the unsent data,
   wherein the other base station, when it becomes possible to transmit data to the mobile station, transmits the other part of the unsent data to the mobile station.

10. A base station for transmitting data to a mobile station in a mobile communications system, comprising:
    a reception section for receiving a switch request from a mobile station on data transmission to the mobile station, the switch request being that a connection of the mobile station switches from the base station to another base station; and
    a transmission controller controlling such that when it is determined that the connection of the mobile station switches to the other base station, one part of unsent data destined for the mobile station is transmitted to the mobile station and the other part of unsent data to the other base station, the one part of the unsent data starting from a smallest sequence number in ascending order of a sequence of the unsent data, and the other part of the unsent data starting from a sequence position which is larger in sequence number than a smallest sequence position,
    wherein the transmission controller determines the sequence position based on a first transmission rate between the base station and the mobile station and a second transmission rate between the base station and the other base station.

11. The base station according to claim 10, wherein the transmission controller controls timing of switching the connection of the mobile station from the base station to the other base station.

12. The base station according to claim 11, wherein if there is a remaining part of the unsent data when approaching the timing, the transmission controller sequentially transmits the remaining part to the other base station starting from a smallest sequence number in ascending order of the remaining part.

13. The base station according to claim 11, wherein the timing is determined based on a first transmission rate between the base station and the mobile station and a second transmission rate between the base station and the other base station.

14. The base station according to claim 12, wherein the timing is determined based on a first transmission rate between the base station and the mobile station and a second transmission rate between the base station and the other base station.

15. A non-transitory computer-readable medium storing a computer-executable program that instructs a computer to function as a base station for transmitting data between a first station and a second station in a mobile communications system, the program causing the base station to perform the following:
    receiving a switch request from a mobile station on data transmission to the mobile station, the switch request being that a connection of the mobile station switches from the base station to another base station; and
    when it is determined that the connection of the mobile station switches to the other base station, transmitting one part of unsent data destined for the mobile station to the mobile station and the other part of unsent data to the other base station, the one part of the unsent data starting from a smallest sequence number in ascending order of a sequence of the unsent data, and the other part of the unsent data starting from a largest sequence number in descending order of the sequence of the unsent data,
    wherein the other base station, when it becomes possible to transmit data to the mobile station, transmits the other part of the unsent data to the mobile station.

16. A non-transitory computer-readable medium storing a computer-executable program that instructs a computer to function as a base station for transmitting data between a first station and a second station in a mobile communications system, the program causing the base station to perform the following:
    receiving a switch request from a mobile station on data transmission to the mobile station, the switch request being that a connection of the mobile station switches from the base station to another base station; and
    when it is determined that the connection of the mobile station switches to the other base station, transmitting one part of unsent data destined for the mobile station to the mobile station and the other part of unsent data to the other base station, the one part of the unsent data starting from a smallest sequence number in ascending order of a sequence of the unsent data, and the other part of the unsent data starting from a sequence position which is larger in sequence number than a smallest sequence position,
    wherein the sequence position is determined based on a first transmission rate between the base station and the mobile station and a second transmission rate between the base station and the other base station.

* * * * *